(12) United States Patent
Li et al.

(10) Patent No.: US 12,176,509 B2
(45) Date of Patent: Dec. 24, 2024

(54) BATTERY, APPARATUS, AND PREPARATION METHOD AND PREPARATION APPARATUS OF BATTERY

(71) Applicant: CONTEMPORARY AMPEREX TECHNOLOGY (HONG KONG) LIMITED, Hong Kong (CN)

(72) Inventors: Quanguo Li, Ningde (CN); Yonghuang Ye, Ningde (CN); Chengdu Liang, Ningde (CN); Haizu Jin, Ningde (CN); Qian Liu, Ningde (CN); Xia Hu, Ningde (CN); Xiaofu Xu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/053,493

(22) Filed: Nov. 8, 2022

(65) Prior Publication Data
US 2023/0061760 A1 Mar. 2, 2023

Related U.S. Application Data

(63) Continuation of application No. PCT/CN2020/119736, filed on Sep. 30, 2020.

(51) Int. Cl.
*H01M 10/658* (2014.01)
*H01M 50/375* (2021.01)

(52) U.S. Cl.
CPC ....... *H01M 10/658* (2015.04); *H01M 50/375* (2021.01)

(58) Field of Classification Search
None
See application file for complete search history.

(56) References Cited

U.S. PATENT DOCUMENTS 8,993,140 B2 * 3/2015 Schiemann ....... H01M 10/0525
429/61
9,083,065 B2 7/2015 Carkner
(Continued)

FOREIGN PATENT DOCUMENTS

| CN | 101262049 A | * | 9/2008 | .............. H01M 2/10 |
| CN | 101409369 A | | 4/2009 | |

(Continued)

OTHER PUBLICATIONS

The World Intellectual Property Organization (WIPO) International Search Report and Written Opinion for PCT/CN2020/119736 Apr. 28, 2021 17 pages (including English translation).

(Continued)

*Primary Examiner* — Amanda J Barrow
(74) *Attorney, Agent, or Firm* — ANOVA LAW GROUP, PLLC

(57) ABSTRACT

This application provides a battery, an apparatus, a preparation method of battery, and a preparation apparatus of battery. The battery includes a first battery cell, a second battery cell, and a first thermal insulation member. The second battery cell is disposed adjacent to the first battery cell, an energy density of the second battery cell is less than that of the first battery cell, and the first thermal insulation member is disposed between the first battery cell and the second battery cell.

14 Claims, 15 Drawing Sheets

(56) References Cited

U.S. PATENT DOCUMENTS

| | | | |
|---|---|---|---|
| 9,799,873 B2* | 10/2017 | Kohlberger | B60L 58/21 |
| 9,882,197 B2 | 1/2018 | Wang et al. | |
| 10,128,528 B2* | 11/2018 | Zhang | H01M 10/06 |
| 10,153,636 B1 | 12/2018 | Vander Lind et al. | |
| 10,177,423 B2 | 1/2019 | Heeg et al. | |
| 10,434,894 B2 | 10/2019 | Li et al. | |
| 10,587,001 B2 | 3/2020 | Park | |
| 10,673,103 B2 | 6/2020 | Hoshina et al. | |
| 10,907,981 B2 | 2/2021 | Li et al. | |
| 2003/0068557 A1 | 4/2003 | Kumashiro et al. | |
| 2006/0197496 A1 | 9/2006 | Iijima et al. | |
| 2007/0072059 A1 | 3/2007 | Kitao et al. | |
| 2008/0067972 A1 | 3/2008 | Takami et al. | |
| 2008/0241666 A1 | 10/2008 | Baba et al. | |
| 2009/0162751 A1 | 6/2009 | Honbo et al. | |
| 2010/0136391 A1 | 6/2010 | Prilutsky et al. | |
| 2010/0304206 A1 | 12/2010 | Nakashima et al. | |
| 2011/0086248 A1 | 4/2011 | Nakura | |
| 2012/0074894 A1 | 3/2012 | Chen et al. | |
| 2012/0126753 A1 | 5/2012 | Carkner et al. | |
| 2012/0164490 A1 | 6/2012 | Itoi et al. | |
| 2012/0189885 A1 | 7/2012 | Kishii et al. | |
| 2013/0089761 A1 | 4/2013 | Schiemann et al. | |
| 2013/0337310 A1 | 12/2013 | Omura et al. | |
| 2014/0020235 A1 | 1/2014 | Aramaki et al. | |
| 2014/0087227 A1 | 3/2014 | Shih et al. | |
| 2014/0181551 A1* | 6/2014 | Rahal-Arabi | G06F 1/3296 713/340 |
| 2014/0186659 A1* | 7/2014 | Dhar | B60L 50/62 429/9 |
| 2014/0342216 A1* | 11/2014 | Kohlberger | H01M 16/00 429/158 |
| 2015/0132625 A1 | 5/2015 | Miyata et al. | |
| 2015/0188188 A1 | 7/2015 | Zhang et al. | |
| 2015/0188207 A1* | 7/2015 | Son | H01M 50/271 429/224 |
| 2015/0280276 A1 | 10/2015 | Lemke et al. | |
| 2015/0300538 A1 | 10/2015 | Al-Atat et al. | |
| 2015/0303444 A1 | 10/2015 | Wang et al. | |
| 2015/0357687 A1 | 12/2015 | Heeg et al. | |
| 2015/0357688 A1 | 12/2015 | Heeg et al. | |
| 2015/0372359 A1 | 12/2015 | Shih et al. | |
| 2016/0099451 A1 | 4/2016 | Murai et al. | |
| 2016/0126546 A1 | 5/2016 | Takami et al. | |
| 2016/0200214 A1 | 7/2016 | Ishibashi et al. | |
| 2016/0301045 A1 | 10/2016 | Tyler et al. | |
| 2016/0301046 A1 | 10/2016 | Tyler et al. | |
| 2016/0301117 A1 | 10/2016 | Tyler et al. | |
| 2016/0329617 A1 | 11/2016 | Omura et al. | |
| 2016/0380315 A1 | 12/2016 | Weicker et al. | |
| 2017/0179535 A1 | 6/2017 | Murashi et al. | |
| 2017/0346089 A1 | 11/2017 | Yamamoto et al. | |
| 2017/0365886 A1 | 12/2017 | Hoshina et al. | |
| 2018/0034023 A1 | 2/2018 | Newman et al. | |
| 2018/0138478 A1 | 5/2018 | Chan | |
| 2018/0145383 A1* | 5/2018 | Krishnan | H01M 10/0413 |
| 2018/0159101 A1 | 6/2018 | Tsang et al. | |
| 2018/0212458 A1 | 7/2018 | Kawai et al. | |
| 2018/0217218 A1 | 8/2018 | Huang et al. | |
| 2018/0351219 A1 | 12/2018 | Smith et al. | |
| 2019/0067658 A1 | 2/2019 | Fujiwara et al. | |
| 2019/0074560 A1 | 3/2019 | Reimer et al. | |
| 2019/0103625 A1 | 4/2019 | Haraguchi et al. | |
| 2019/0225093 A1* | 7/2019 | Li | H01M 50/242 |
| 2019/0226859 A1* | 7/2019 | Li | G01C 21/3697 |
| 2019/0267686 A1 | 8/2019 | Shimizu et al. | |
| 2019/0334143 A1* | 10/2019 | Sugeno | H01M 50/276 |
| 2019/0386269 A1 | 12/2019 | Tyler et al. | |
| 2020/0014000 A1 | 1/2020 | Roddy et al. | |
| 2020/0058968 A1 | 2/2020 | Thompson et al. | |
| 2020/0106126 A1 | 4/2020 | Yokoshima et al. | |
| 2020/0130511 A1 | 4/2020 | Botts et al. | |
| 2020/0212526 A1 | 7/2020 | Wu et al. | |
| 2020/0295325 A1 | 9/2020 | Tyler et al. | |
| 2020/0313255 A1 | 10/2020 | Wu et al. | |
| 2020/0321568 A1 | 10/2020 | Roddy et al. | |
| 2020/0381928 A1 | 12/2020 | Isaksson et al. | |
| 2021/0025723 A1 | 1/2021 | Li et al. | |
| 2021/0050635 A1* | 2/2021 | Lee | H01M 50/213 |
| 2021/0074979 A1* | 3/2021 | Kwak | H01M 4/364 |
| 2021/0091428 A1* | 3/2021 | Naito | H01M 50/209 |
| 2021/0104798 A1 | 4/2021 | Jiang et al. | |
| 2021/0104801 A1 | 4/2021 | Chu et al. | |
| 2021/0296721 A1 | 9/2021 | Omura et al. | |
| 2021/0328281 A1* | 10/2021 | Chu | H01M 10/52 |
| 2021/0391619 A1 | 12/2021 | Chang et al. | |
| 2021/0391628 A1 | 12/2021 | Hattendorff et al. | |
| 2022/0069406 A1 | 3/2022 | Roddy et al. | |
| 2022/0123375 A1 | 4/2022 | Liang et al. | |
| 2022/0123427 A1 | 4/2022 | Ren et al. | |
| 2022/0320650 A1 | 10/2022 | Tyler et al. | |
| 2022/0416330 A1 | 12/2022 | Li et al. | |
| 2023/0070894 A1 | 3/2023 | Li et al. | |
| 2023/0076751 A1 | 3/2023 | Xu et al. | |
| 2023/0163296 A1 | 5/2023 | Li et al. | |
| 2023/0187756 A1 | 6/2023 | Chu et al. | |

FOREIGN PATENT DOCUMENTS

| | | | |
|---|---|---|---|
| CN | 101504977 A | 8/2009 | |
| CN | 101635372 A | 1/2010 | |
| CN | 101675555 A | 3/2010 | |
| CN | 201749897 U | 2/2011 | |
| CN | 102027617 A | 4/2011 | |
| CN | 102447301 A | 5/2012 | |
| CN | 202308227 U | 7/2012 | |
| CN | 101242011 B | 9/2012 | |
| CN | 103311562 A | 9/2013 | |
| CN | 104126238 A | 10/2014 | |
| CN | 104979503 A | 10/2015 | |
| CN | 105006586 A | 10/2015 | |
| CN | 105186066 A | 12/2015 | |
| CN | 105849968 A | 8/2016 | |
| CN | 105914804 A | 8/2016 | |
| CN | 106207016 A | 12/2016 | |
| CN | 206225503 U | 6/2017 | |
| CN | 107004920 A | 8/2017 | |
| CN | 107112603 A | 8/2017 | |
| CN | 107256971 A | 10/2017 | |
| CN | 206567773 U | 10/2017 | |
| CN | 108598598 A | 9/2018 | |
| CN | 208507849 U | 2/2019 | |
| CN | 109428114 A | 3/2019 | |
| CN | 208674305 U | 3/2019 | |
| CN | 109659465 A | 4/2019 | |
| CN | 110048151 A | 7/2019 | |
| CN | 110065414 A | 7/2019 | |
| CN | 110071236 A | 7/2019 | |
| CN | 209071461 U | 7/2019 | |
| CN | 110265591 A | 9/2019 | |
| CN | 110265627 A | 9/2019 | |
| CN | 110380144 A | 10/2019 | |
| CN | 110444835 A | 11/2019 | |
| CN | 110456275 A | 11/2019 | |
| CN | 110678393 A | 1/2020 | |
| CN | 110739424 A | 1/2020 | |
| CN | 210040332 U | 2/2020 | |
| CN | 210403875 U | 4/2020 | |
| CN | 111106277 A | 5/2020 | |
| CN | 111106278 A | 5/2020 | |
| CN | 111446488 A | 7/2020 | |
| CN | 111584792 A | 8/2020 | |
| CN | 211295236 U | 8/2020 | |
| CN | 111668408 A | 9/2020 | |
| CN | 111668409 A | 9/2020 | |
| CN | 211629259 U | 10/2020 | |
| CN | 111900294 A | 11/2020 | |
| CN | 213584016 U | 6/2021 | |
| DE | 102012215495 A1 | 3/2014 | |
| DE | 202017104111 * | 11/2018 | H01M 2/10 |
| DE | 102017212223 A1 | 1/2019 | |
| EP | 1265302 A2 | 12/2002 | |
| EP | 3193402 A1 | 7/2017 | |
| EP | 3261161 A1 | 12/2017 | |

(56) References Cited

FOREIGN PATENT DOCUMENTS

| | | | |
|---|---|---|---|
| EP | 3316391 A1 | 5/2018 | |
| EP | 3358706 A1 | 8/2018 | |
| EP | 3675218 A1 | 7/2020 | |
| EP | 3926724 A2 | 12/2021 | |
| JP | H07320775 A | 12/1995 | |
| JP | H11121041 A | 4/1999 | |
| JP | 2003174734 A | 6/2003 | |
| JP | 2004342580 A | 12/2004 | |
| JP | 2005071917 A | 3/2005 | |
| JP | 2007059145 A | 3/2007 | |
| JP | 2008226518 A | 9/2008 | |
| JP | 2009021223 A | 1/2009 | |
| JP | 2010250984 A | 11/2010 | |
| JP | 2011065906 A | 3/2011 | |
| JP | 2012113899 A | 6/2012 | |
| JP | 2012234696 A | 11/2012 | |
| JP | 2013509688 A | 3/2013 | |
| JP | 2013209688 A | 10/2013 | |
| JP | 2014072025 A | 4/2014 | |
| JP | 2014112463 A | 6/2014 | |
| JP | 2015018706 A | 1/2015 | |
| JP | 2015133169 A | 7/2015 | |
| JP | 2015170591 A | 9/2015 | |
| JP | 2015530858 A | 10/2015 | |
| JP | 2015204247 A | 11/2015 | |
| JP | 2015211025 A | 11/2015 | |
| JP | 2017139844 A | 8/2017 | |
| JP | 2019129149 A | 8/2019 | |
| JP | 2019139879 A | 8/2019 | |
| JP | 2020035692 A | 3/2020 | |
| JP | 2020527848 A | 9/2020 | |
| JP | 2023509197 A | 3/2023 | |
| JP | 2023509198 A | 3/2023 | |
| KR | 1020190082974 A | 7/2019 | |
| WO | 2004095611 A1 | 11/2004 | |
| WO | 2009113281 A1 | 9/2009 | |
| WO | 2011114349 A2 | 9/2011 | |
| WO | 2012014418 A1 | 2/2012 | |
| WO | 2012060031 A1 | 5/2012 | |
| WO | 2013011915 A1 | 1/2013 | |
| WO | 2013031613 A1 | 3/2013 | |
| WO | 2013069308 A1 | 5/2013 | |
| WO | 2013099293 A1 | 7/2013 | |
| WO | 2014045569 A1 | 3/2014 | |
| WO | 2017191679 A1 | 11/2017 | |
| WO | 2019123903 A1 | 6/2019 | |
| WO | WO 2019/161751 * | 8/2019 | ............ H01M 16/00 |
| WO | 2019187313 A1 | 10/2019 | |
| WO | WO 2019/187313 * | 10/2019 | .......... H01M 10/658 |
| WO | 2020053251 A1 | 3/2020 | |
| WO | 2020133660 A1 | 7/2020 | |
| WO | 2020134054 A1 | 7/2020 | |
| WO | 2020135152 A1 | 7/2020 | |
| WO | WO 2020/133659 * | 7/2020 | ............ H01M 10/52 |
| WO | 2022067808 A1 | 4/2022 | |
| WO | 2022067809 A1 | 4/2022 | |
| WO | 2022067810 A1 | 4/2022 | |

OTHER PUBLICATIONS

The China National Intellectual Property Administration (CNIPA) The First Office Action for Chinese Application 202010786523.9 Oct. 24, 2022 17 Pages (With Translation).
The China National Intellectual Property Administration (CNIPA) The Second Office Action for Chinese Application 202010786523.9 Feb. 28, 2023 10 Pages (With Translation).
The China National Intellectual Property Administration (CNIPA) The First Office Action for Chinese Application 202010786641.X Oct. 26, 2022 16 Pages (With Translation).
The European Patent Office (EPO) Extended Search Report for EP Application No. 20947010.3 Jan. 25, 2023 9 Pages.
The European Patent Office (EPO) Extended Search Report for EP Application No. 20955830.3 Mar. 30, 2023 8 Pages.
The European Patent Office (EPO) Extended Search Report for EP Application No. 21789597.8 Nov. 16, 2022 11 Pages.
The European Patent Office (EPO) Extended Search Report for EP Application No. 21789597.8 Aug. 12, 2022 13 Pages.
The European Patent Office (EPO) Extended Search Report for EP Application No. 21790065.3 Nov. 18, 2022 11 Pages.
The European Patent Office (EPO) Extended Search Report for EP Application No. 21790065.3 Aug. 18, 2022 13 Pages.
"Particle size analysis—Laser diffraction methods", Feb. 26, 2016. GB/T 19077-2016/ ISO 13320:2009.
The India Intellectual Proprty Office (INPO) Examination Report for IN Application No. 202217009095 Dec. 16, 2022 6 Pages.
The European Patent Office (EPO) Extended Search Report for EP Application No. 20947817.1 Nov. 30, 2022 7 Pages.
Chengyi Lin et al., "General rules for analytical scanning electron microscopy", Jan. 23, 1997. JY/T 010-1996.
The World Intellectual Property Organization (WIPO) International Search Report and Written Opinion for PCT/CN2020/105474 Apr. 26, 2021 15 pages (including English translation).
The United States Patent and Trademark Office (USPTO) The office action for 17985813 Jun. 14, 2023 19 Pages.
The World Intellectual Property Organization (WIPO) International Search Report and Written Opinion for PCT/CN2020/119737 Jul. 2, 2021 15 pages (including English translation).
The World Intellectual Property Organization (WIPO) International Search Report and Written Opinion for PCT/CN2020/119738 Jun. 25, 2021 17 pages (including English translation).
The World Intellectual Property Organization (WIPO) International Search Report and Written Opinion for PCT/CN2020/129475 Aug. 16, 2021 13 pages (including English translation).
The World Intellectual Property Organization (WIPO) International Search Report and Written Opinion for PCT/CN2020/139180 Sep. 29, 2021 13 pages (including English translation).
The World Intellectual Property Organization (WIPO) International Search Report and Written Opinion for PCT/CN2021/089319 Jul. 26, 2021 14 pages (including English translation).
The World Intellectual Property Organization (WIPO) International Search Report and Written Opinion for PCT/CN2021/089665 Jul. 30, 2021 17 pages (including English translation).
The World Intellectual Property Organization (WIPO) International Search Report and Written Opinion for PCT/CN2021/109686 Apr. 25, 2022 12 pages (including English translation).
The United States Patent and Trademark Office (USPTO) The office action for 17985813 Mar. 8, 2023 21 Pages.
The United States Patent and Trademark Office (USPTO) The office action for 17985851 Mar. 22, 2023 13 Pages.
The United States Patent and Trademark Office (USPTO) The office action for 18149672 May 30, 2023 7 Pages.
The United States Patent and Trademark Office (USPTO) The Application for U.S. Appl. No. 18/054,375, filed Nov. 10, 2022 44 Pages.
The United States Patent and Trademark Office (USPTO) The Application for U.S. Appl. No. 17/970,603, filed Oct. 21, 2022 51 Pages.
United States Patent and Trademark Office (USPTO) Notice of Allowance for Application No. 17985813 Dec. 12, 2023 17 Pages.
Japan Patent Office (JPO) The Notice of Reasons for Refusal For JP Application No. 2022-542009 Sep. 4, 2023 6 Pages (Translation Included).
The China National Intellectual Property Administration (CNIPA) The First Office Action for CN Application No. 202080054687.0 Jul. 24, 2023 14 Pages (Including English translation).
The China National Intellectual Property Administration (CNIPA) The First Office Action for CN Application No. 202080054659.9 Jun. 24, 2023 14 Pages (Including English translation).
The European Patent Office (EPO) The Extended European Search Report for EP Application No. 20961838.8 Aug. 17, 2023 10 Pages.
Japan Patent Office (JPO) Notice of Reasons for Refusal For JP Application No. 2022-539699 Jul. 31, 2023 8 Pages (Translation Included).
The European Patent Office (EPO) The Extended European Search Report for EP Application No. 21937198.6 Aug. 14, 2023 7 Pages.

(56) References Cited

OTHER PUBLICATIONS

The United States Patent and Trademark Office (USPTO) Office Action for U.S. Appl. No. 17/970,603 Jul. 19, 2023 19 Pages.
The United States Patent and Trademark Office (USPTO) Office Action for U.S. Appl. No. 18/054,375 Aug. 24, 2023 41 Pages.
The United States Patent and Trademark Office (USPTO) Office Action for U.S. Appl. No. 17/985,813 Aug. 9, 2023 49 Pages.
The European Patent Office (EPO) The Extended European Search Report for EP Application No. 20955828.7 Sep. 27, 2023 6 Pages.
The Japan Patent Office (JPO) Notification of Reasons for Refusal for Application No. 2022-542013 Oct. 2, 2023 9 Pages (including translation).
The Japan Patent Office (JPO) Notification of Reasons for Refusal for Application No. 2022-542009 Feb. 5, 2024 8 Pages (including translation).
The Japan Patent Office (JPO) Notification of Reasons for Refusal for Application No. 2022-539699 Jan. 29, 2024 9 Pages (including translation).
United States Patent and Trademark Office (USPTO) Notice of Allowance for U.S. Appl. No. 17/985,813 Feb. 22, 2024 12 Pages.
The Japan Patent Office (JPO) Decision to Grant a Patent for Application No. 2022-542013 Mar. 18, 2024 6 Pages (including translation).
The European Patent Office (EPO) The Extended European Search Report for Application No. 20955829.5 Mar. 25, 2024 8 Pages.
United States Patent and Trademark Office (USPTO) Non-final rejection for U.S. Appl. No. 17/970,603 Apr. 18, 2024 28 Pages.
China National Intellectual Property Administration (CNIPA) Office Action 1 for Application No. 202080102030.7 Jun. 18, 2024 11 Pages (including translation).
Korean Intellectual Property Office (KIPO) Notice of Allowance for 10-2022-7021878 May 10, 2024 5 Pages (including translation).
China National Intellectual Property Administration (CNIPA) Office Action 1 for Application No. 202080104131.8 Jun. 4, 2024 14 Pages (including translation).
The Japan Patent Office (JPO) Decision to Grant a Patent for Application No. 2022-542009 Aug. 5, 2024 6 Pages (including translation).
Korean Intellectual Property Office (KIPO) Office Action 1 for 10-2022-7022467 Aug. 28, 2024 13 Pages (including translation).

* cited by examiner

BATTERY, APPARATUS, AND PREPARATION METHOD AND PREPARATION APPARATUS OF BATTERY

CROSS REFERENCE TO RELATED APPLICATION

This application is a continuation application of International Patent Application No. PCT/CN2020/119736, filed with China National Intellectual Property Administration on Sep. 30, 2020, which is incorporated herein by reference in its entirety.

TECHNICAL FIELD

This application relates to the field of energy storage technologies, and in particular, to a battery, an apparatus, a preparation method of battery, and a preparation apparatus of battery.

BACKGROUND

Energy conservation and emission reduction are key to sustainable development in automobile industry. As such, due to the advantage of energy conservation and emission reduction, electric vehicles have become an important part for sustainable development in automobile industry. For electric vehicles, battery technology is an important factor related to their development. In the development of the battery technology, in addition to performance improvement, safety is another important issue of batteries. If safety of a battery cannot be guaranteed, the battery is unusable. Therefore, improving safety of the battery requires urgent attention in the battery technology.

SUMMARY

In view of the foregoing problem, embodiments of this application provides a battery, an apparatus, a preparation method of battery, and a preparation apparatus of battery, so as to improve use safety of the battery.

To implement the foregoing objectives, the embodiments of this application provide the following technical solutions.

A first aspect of the embodiments of this application provides a battery, including:
a first battery cell;
a second battery cell, disposed adjacent to the first battery cell, where an energy density of the second battery cell is less than that of the first battery cell; and
a first thermal insulation member, disposed between the first battery cell and the second battery cell.

Compared with the prior art, the battery provided in the embodiments of this application has the following advantages.

The battery provided in the embodiments of this application includes a first battery cell and a second battery cell, where an energy density of the second battery cell is less than that of the first battery cell, thermal stability of the first battery cell is lower than that of the second battery cell, and thermal failure reaction of the first battery cell is more violent than that of the second battery cell. After thermal failure occurs in the first battery cell, the first battery cell generates high temperature gas, and temperature of the first battery cell rises sharply. However, a first thermal insulation member is disposed between the first battery cell and the second battery cell, and the first thermal insulation member can effectively delay or stop thermal transfer between the first battery cell and the second battery cell, so as to effectively reduce a probability that the first battery cell triggers chain reaction of the second battery cell, thereby improving use safety of the battery.

In some implementations, the first thermal insulation member includes a hollow part, where in a thickness direction of the first thermal insulation member, the hollow part runs through the first thermal insulation member, and the hollow part is constructed to provide a space allowing the first battery cells and/or the second battery cells to swell. Therefore, when the first battery cell or the second battery cell swells, excess volume of the swelling first battery cell or second battery cell can be filled into the hollow part, so as to effectively buffer swelling force of the battery.

In some implementations, the first thermal insulation member is constructed as a square frame structure, facilitating preparation of the hollow part.

In some implementations, the first thermal insulation member further includes a filling member, configured to fill the hollow part. The filling member is elastic, so that it can reliably fasten the first battery cell and the second battery cell when no thermal failure occurs in the first battery cell and the second battery cell; and provides a space allowing the first battery cell and the second battery cell to swell and deform when thermal failure occurs in the first battery cell and the second battery cell.

In some implementations, the filling member is selected from at least one of foam, rubber, thermal insulation wool, or aerogel thermal insulation pad. The filling members made of various materials are available for selection based on a specific type of the first battery cell and the second battery cell, so that the filling member meets use requirements and safety requirements.

In some implementations, the ratio of the energy density $E_1$ of the first battery cell to the energy density $E_2$ of the second battery cell ranges from $1.26 \leq E_1/E_2 \leq 2.14$. This can ensure use safety of the battery, and can also improve capacity of the battery.

In some implementations, the first battery cell and the second battery cell are alternately arranged in an arrangement mode of n first battery cells and m second battery cells, where $n \geq 1$, and $m \geq 1$. In this way, the first battery cell and the second battery cell that have different energy densities are alternately arranged, helping reduce thermal diffusion, and improving use safety of the battery.

In some implementations, the battery includes at least two of the first battery cells, and a second thermal insulation member is disposed between the two adjacent first battery cells. The second thermal insulation member can effectively delay or stop thermal transfer between the adjacent first battery cells, so as to effectively reduce the probability that the first battery cell triggers chain reaction of its adjacent first battery cell, thereby improving use safety of the battery.

In some implementations, the battery includes at least two of the second battery cells, and a third thermal insulation member is disposed between the two adjacent second battery cells. The third thermal insulation member can effectively delay or stop thermal transfer between the adjacent second battery cells and its adjacent second battery cell, so as to effectively reduce the probability that the second battery cell triggers chain reaction of its adjacent second battery cell, thereby improving use safety of the battery.

In some implementations, a first pressure relief mechanism is disposed on the first battery cell, and the first pressure relief mechanism is configured to be actuated when internal pressure or temperature of the first battery cell reaches a threshold, to release the internal pressure; a second pressure relief mechanism is disposed on the second battery cell, and the second pressure relief mechanism is configured to be actuated when internal pressure or temperature of the second battery cell reaches a threshold, to release the internal pressure; and an area of the first pressure relief mechanism is greater than an area of the second pressure relief mechanism. The first pressure relief mechanism is disposed on the first battery cell, so that when internal pressure or temperature of the first battery cell reaches the threshold, the first battery cell can release the internal pressure. The second pressure relief mechanism is disposed on the second battery cell, so that when internal pressure or temperature of the second battery cell reaches the threshold, the second battery cell can also release the internal pressure. An energy density of the first battery cell is greater than an energy density of the second battery cell, and thermal failure reaction of the first battery cell is more violent than thermal failure reaction of the second battery cell. The area of the first pressure relief mechanism is limited to be greater than the area of the second pressure relief mechanism, so that the first battery cell with more violent failure reaction can effectively release pressure in a timely manner by using the first pressure relief mechanism with a larger area, so as to effectively relieve the sharp temperature rise of the first battery cell and effectively reduce the probability of chain reaction triggered by thermal failure of the first battery cell, thereby improving overall use safety of the battery.

In some implementations, the battery further includes a discharge channel, where the discharge channel is disposed facing the first pressure relief mechanism and/or the second pressure relief mechanism, and the discharge channel is configured to collect emissions from the first battery cell when the first pressure relief mechanism is actuated, and/or collect emissions from the second battery cell when the second pressure relief mechanism is actuated. The discharge channel is disposed so that when internal pressure or temperature of the first battery cell and/or the second battery cell reaches a threshold, the internal pressure of the first battery cell and/or the second battery cell can be released in a timely manner, making the battery safer to use.

In some implementations, the battery includes at least two of the discharge channels, the discharge channels are spaced apart from each other, and the first pressure relief mechanism and the second pressure relief mechanism are disposed facing the different discharge channels respectively. Emissions from the first battery cell and the second battery cell can all be effectively discharged out of the battery in a timely manner, so as to effectively reduce the probability that the discharge channels are blocked by solid substances discharged by the first battery cell and the second battery cell, thereby improving use safety of the battery.

In some implementations, the battery includes at least two of the first battery cells, and the first pressure relief mechanisms of the two adjacent first battery cells are disposed facing the different discharge channels respectively. Therefore, different first battery cells can discharge emissions via the different discharge channels respectively, so that the emissions from the first battery cells can be effectively discharged out of the battery in a timely manner. In addition, a probability that thermal failure of one first battery cell causes thermal failure of its adjacent first battery cell can be effectively reduced, helping relieve chain reaction of thermal failure and improving use safety of the battery.

In some implementations, the battery includes at least two of the second battery cells, and the second pressure relief mechanisms of the two adjacent second battery cells are disposed facing the different discharge channels respectively. Therefore, the different second battery cells can discharge emissions via the different discharge channels respectively, so that the emissions from the second battery cells can be effectively discharged out of the battery in a timely manner. In addition, a probability of thermal failure of the adjacent second battery cell caused by thermal failure of one second battery cell can be effectively reduced, thereby helping relieve chain reaction of thermal failure and improving use safety of the battery.

In some implementations, the battery further includes a box body, where the box body has a plurality of walls, the plurality of walls are configured to enclose an accommodating cavity for accommodating the first battery cell and the second battery cell, a hollow chamber is provided in at least one of the plurality of walls, and the hollow chamber is configured to form the discharge channel. The box body is configured to protect the first battery cell and second battery cell that are placed in the accommodating cavity. The hollow chamber for forming the discharge channel is provided in at least one of the plurality of walls of the box body, so that when internal pressure or temperature of the first battery cell and the second battery cell reaches a threshold, emissions from the first battery cell and the second battery cell can be discharged into the hollow cavity. Therefore, emissions from the first battery cell and the second battery cell during thermal failure can be effectively discharged out of the battery in a timely manner, thereby improving use safety of the battery.

In some implementations, the plurality of walls include a bottom wall, where the bottom wall is configured to support the first battery cell and the second battery cell, and a hollow chamber is provided in the bottom wall. In this way, emissions in the first battery cell are discharged downwards and enter the hollow chamber at the bottom via the first pressure relief mechanism, and emissions in the second battery cell are also discharged downwards and enter the hollow chamber at the bottom via the second pressure relief mechanism. With this arrangement mode of the battery, after the battery is placed in a battery compartment of a vehicle, the battery can discharge emissions to the bottom of the vehicle rather than discharging emissions to a passenger compartment that is located above the battery compartment, thereby further improving use safety of the battery.

In some implementations, the at least one wall is constructed to be broken when the first pressure relief mechanism and/or the second pressure relief mechanism is actuated, to cause the emissions from the first battery cell and/or the second battery cell to pass through the at least one wall and enter the corresponding discharge channel. In this way, when internal pressure or temperature of the first battery cell reaches a threshold, the first pressure relief mechanism of the first battery cell is actuated, and emissions in the first battery cell are discharged; and/or when internal pressure or temperature of the second battery cell reaches a threshold, the second pressure relief mechanism of the second battery cell is actuated, and emissions in the second battery cell are discharged, the emissions discharged by the first battery cell and/or the second battery cell may act on the at least one wall of the box body, so that a part of the box body facing the first pressure relief mechanism and/or a part of the box body facing the second pressure relief mechanism is broken. The hollow chamber of the box body communicates with the first pressure relief mechanism and/or the second pressure relief mechanism, so that the emissions in the first battery cell and/or the second battery cell can be effectively discharged into the discharge channel in a timely manner, thereby further improving use safety of the battery.

In some implementations, a first through-hole is provided in the at least one wall, and the first through-hole is constructed to communicate with the discharge channel, to allow the emissions from the first battery cell and/or the second battery cell to enter the corresponding discharge channel via the first through-hole when the first battery cell and/or the second battery cell is actuated. In this way, when internal pressure or temperature of the first battery cell reaches a threshold, the first pressure relief mechanism of the first battery cell is actuated, and emissions in the first battery cell is discharged; and/or internal pressure or temperature of the second battery cell reaches a threshold, the second pressure relief mechanism of the second battery cell is actuated, and emissions in the second battery cell is discharged, the emissions discharged by the first battery cell and/or the second battery cell enter the hollow chamber of the box body via the first through-hole, so that the emissions in the first battery cell and/or the second battery cell can be effectively discharged into the discharge channel in a timely manner, thereby further improving use safety of the battery.

In some implementations, the battery further includes a thermal management part, configured to accommodate fluid to adjust temperature of the first battery cell and the second battery cell, where the thermal management part is disposed between the first battery cell and second battery cell and at least one wall, and the thermal management part is constructed to be broken when the first pressure relief mechanism and/or the second pressure relief mechanism is actuated, to allow the fluid to flow out. In this way, the emissions from the first battery cell and/or the second battery cell can enter the discharge channel via the broken thermal management part. In addition, with the thermal management part broken, the fluid can flow out, so that internal temperature of the battery is rapidly reduced through the fluid, helping relieve chain reaction of thermal failure, and improving use safety of the battery.

In some implementations, a second through-hole is provided in the thermal management part, and the second through-hole is constructed to communicate with the discharge channel, to allow the emissions from the first battery cell and/or the second battery cell to enter the corresponding discharge channel via the second through-hole when the first pressure relief mechanism and/or the second pressure relief mechanism is actuated. In this way, the emissions discharged by the first battery cell and/or the second battery cell can rapidly and smoothly enter the discharge channel via the second through-hole, thereby improving use safety of the battery.

In some implementations, the second through-hole communicates with the discharge channel via the first through-hole. Therefore, the emissions discharged by the first battery cell and/or the second battery cell can rapidly and smoothly enter the first through-hole via the second through-hole, and then enter the discharge channel, thereby improving use safety of the battery.

A second aspect of the embodiments of this application provides an apparatus, including the foregoing battery, where the battery is configured to supply electric energy.

The apparatus in this application is supplied with electric energy by using the foregoing battery. Therefore, the first thermal insulation member can be used to effectively delay or stop thermal transfer between the first battery cell and the second battery cell, so as to effectively reduce the probability that the first battery cell triggers chain reaction of the second battery cell, thereby improving use safety of the battery.

A third aspect of the embodiments of this application provides a preparation method of battery, including the following steps:
configuring a first battery cell;
configuring a second battery cell to be adjacent to the first battery cell, where an energy density of the second battery cell is less than that of the first battery cell; and
configuring a first thermal insulation member, where the first thermal insulation member is disposed between the first battery cell and the second battery cell.

In the preparation method of battery provided in this embodiment, the first battery cell with a higher energy density and the second battery cell with a lower energy density are configured; and the first thermal insulation member is configured between the adjacent first battery cell and second battery cell. In this way, even though the first battery cell has a lower thermal stability and more violent thermal failure reaction than the second battery cell, after thermal failure occurs in the first battery cell, the configured first thermal insulation member can effectively delay or stop thermal transfer between the first battery cell and the second battery cell, so as to effectively reduce the probability that the first battery cell triggers chain reaction of the second battery cell, thereby improving use safety of the battery.

A fourth aspect of the embodiments of this application provides a preparation apparatus of battery, including:
a first battery cell configuration module, configured to configure a first battery cell;
a second battery cell configuration module, configured to configure a second battery cell to be adjacent to the first battery cell, where an energy density of the second battery cell is less than that of the first battery cell; and
a first thermal insulation member configuration module, configured to configure a first thermal insulation member, where the first thermal insulation member is disposed between the first battery cell and the second battery cell.

In the preparation apparatus of battery in this embodiment, the first battery cell configuration module is used to configure the first battery cell; the second battery cell configuration module is used to configure the second battery cell, where the configured second battery cell is disposed adjacent to the first battery cell, and an energy density of the second battery cell is less than that of the first battery cell; and the first thermal insulation member configuration module is used to configure the first thermal insulation member, where the configured first thermal insulation member is disposed between the first battery cell and the second battery cell. In this way, even though the first battery cell has a lower thermal stability and more violent thermal failure reaction than the second battery cell, after thermal runaway occurs in the first battery cell, the first thermal insulation member can effectively delay or stop thermal transfer between the first battery cell and the second battery cell, so as to effectively reduce the probability that the first battery cell triggers chain reaction of the second battery cell, thereby improving use safety of the battery.

REFERENCE NUMERALS

Figure 1:
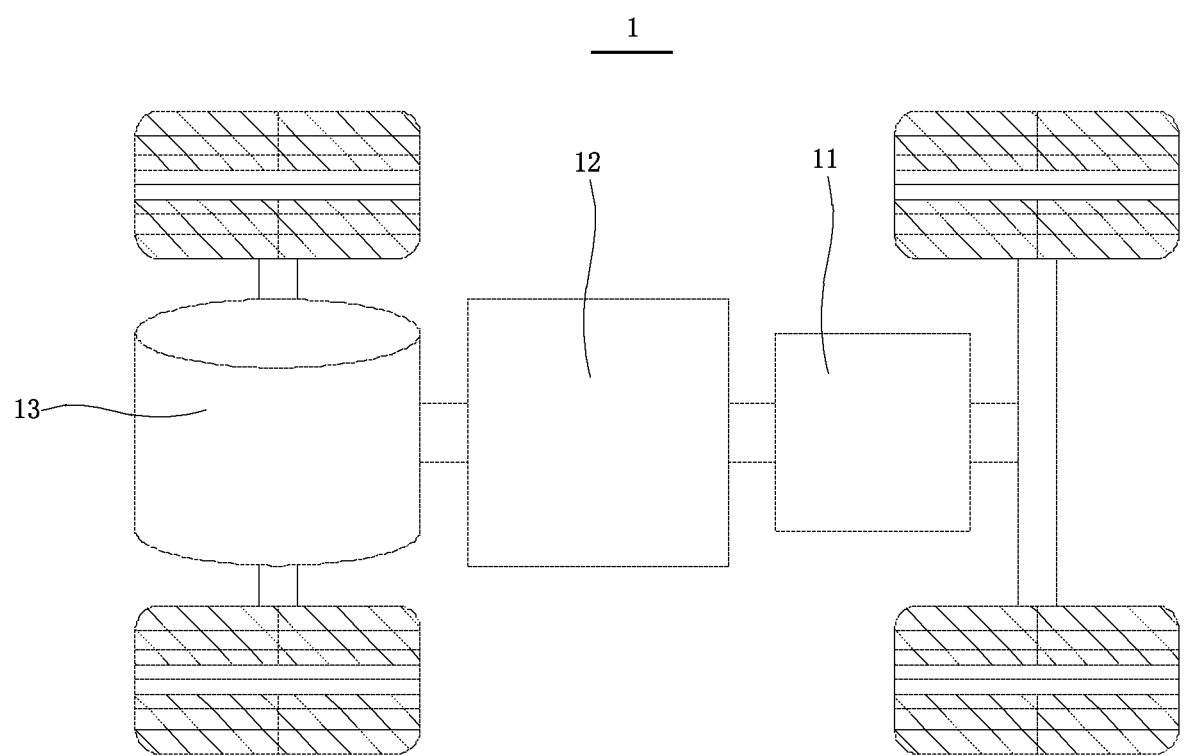
FIG. 1 is a schematic structural diagram of a vehicle according to this application.

1. Vehicle;
   11. Battery;
      111. First battery cell;
         1111. First pressure relief mechanism;
         1112. Positive electrode terminal;
         1113. Negative electrode terminal;
         1114. Housing;
      112. Second battery cell;
         1121. Second pressure relief mechanism;
      113. Box body;
         1131. Bottom wall;
         1132. Side wall;
         1133. First through-hole;
      114. First thermal insulation member;
         1141. Hollow part;
      115. Second thermal insulation member;
      116. Third thermal insulation member;
      117. Discharge channel;
      118. Thermal management part;
         1181. Second through-hole;
   12. Controller; and
   13. Motor.

DESCRIPTION OF EMBODIMENTS

A battery is an apparatus of converting chemical energy into electric energy, and is widely applied to fields of new energy vehicles, energy storage power stations, and the like.

An existing type of battery includes a housing and a plurality of battery cells disposed in the housing, where the plurality of battery cells are connected in series and/or in parallel. The plurality of battery cells include a first battery cell and a second battery cell, where an energy density of the first battery cell is greater than an energy density of the second battery cell.

However, the inventors of this application have found through research that, thermal stability of the first battery cell is lower than thermal stability of the second battery cell, and when thermal failure occurs, failure reaction of the first battery cell is more violent than failure reaction of the second battery cell, that is, high temperature gas generated by the first battery cell is far more than high temperature gas generated by the second battery cell, which easily triggers chain reaction, leading to thermal diffusion, increased occurrence rate of dangers such as fire and explosion, and a use safety issue of the battery.

To resolve the problems of the first battery cell triggering chain reaction, and the resulting thermal diffusion, increased occurrence rate of dangers such as fire and explosion, and use safety issue of the battery, this application provides a battery, an apparatus, a preparation method of battery, and a preparation apparatus of battery. A first thermal insulation member is disposed between the adjacent first battery cell and second battery cell, so as to effectively delay or stop thermal transfer between the first battery cell and the second battery cell. Therefore, when thermal failure occurs in the first battery cell, the first thermal insulation member can stop heat of the first battery cell from being transferred to the second battery cell, so as to effectively reduce the probability of chain reaction caused by the second battery cell absorbing heat generated by thermal failure of the first battery cell, thereby improving overall use safety of the battery.

The following clearly describes the technical solutions in the embodiments of this application with reference to the accompanying drawings in the embodiments of this application, so that the foregoing objectives, features and advantages of the embodiments of this application can be clearer. Apparently, the described embodiments are merely some but not all of the embodiments of this application. All other embodiments obtained by a person of ordinary skill in the art based on the embodiments of this application without creative efforts shall fall within the protection scope of this application.

Embodiments of this application provide an apparatus and a battery. The apparatus provided in this application includes the battery, where the battery is configured to supply electric energy. The apparatus provided in this application is, for example, a mobile phone, a portable device, a laptop, an electric scooter, an electric vehicle, a steamship, a spacecraft, an electric toy, or an electric tool. The spacecraft is, for example, an airplane, a rocket, a space shuttle, or a spaceship. The electric toy includes, for example, a fixed or mobile electric toy, such as a game console, an electric vehicle toy, an electric ship toy, and an electric airplane toy. The electric tool includes, for example, an electric metal cutting tool, an electric grinding tool, an electric assembly tool, and an electric railway-specific tool, such as an electric drill, an electric grinder, an electric wrench, an electric screwdriver, an electric hammer, an electric impact drill, a concrete vibrator, and an electric planer.

The battery described in this application is not limited to be applied to the electric apparatuses described above.

However, for ease of description, the following embodiments are all described by using an electric vehicle as an example.

FIG. 1 is a simple schematic diagram of a vehicle 1 according to an embodiment. The vehicle 1 may be an oil-fueled vehicle, a gas-powered vehicle, or a new energy vehicle. The new energy vehicle may be a battery electric vehicle, a hybrid electric vehicle, an extended-range electric vehicle, or the like. A battery 11 may be disposed in the vehicle 1. In a specific example, the battery 11 may be disposed at a bottom, vehicle head, or vehicle tail of the vehicle 1. The battery 11 may be configured to supply power to the vehicle 1. For example, the battery may be used as an operational power supply for the vehicle 1. The vehicle 1 may further include a controller 12 and a motor 13. The controller 12 is, for example, configured to control the battery 11 to supply power to the motor 13. The battery 11 may be configured to start and navigate the vehicle 1. Certainly, the battery 11 may also be configured to drive the vehicle 1, and replace or partly replace fuel oil or natural gas to supply driving power to the vehicle 1.

Figure 2:
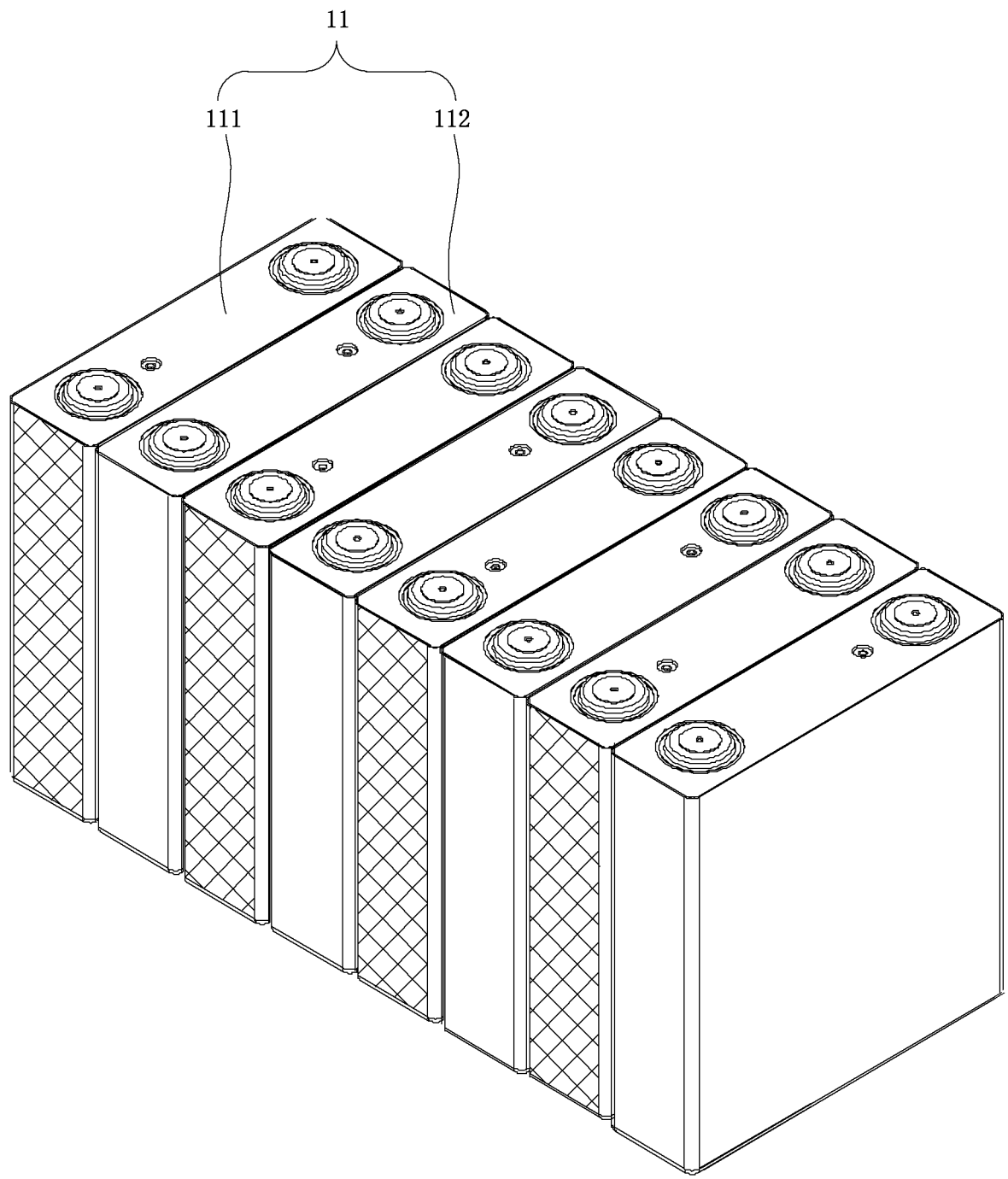
FIG. 2 is a schematic structural diagram of a battery module according to an embodiment of this application.
Figure 3:
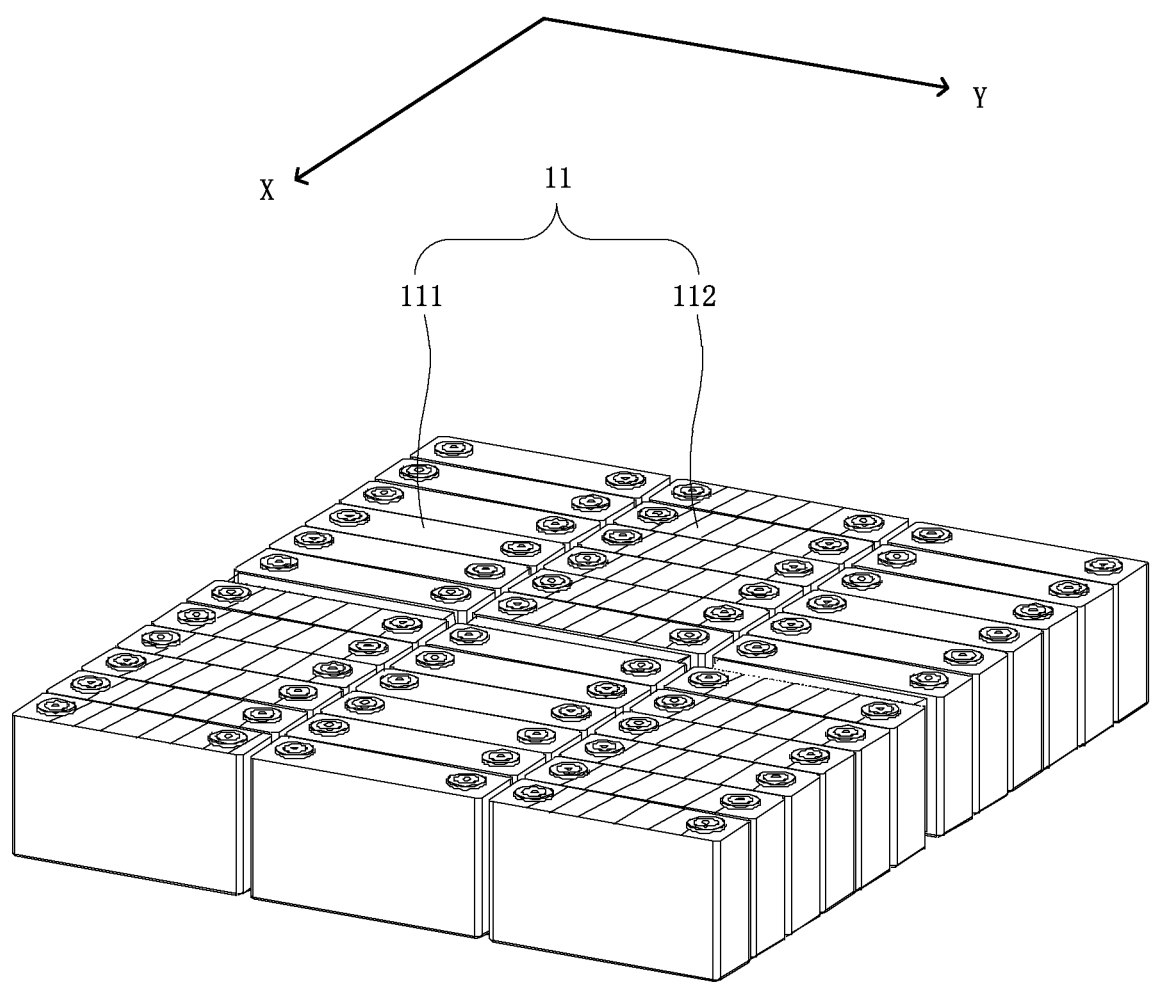
FIG. 3 is a schematic structural diagram of a battery pack according to an embodiment of this application.

The battery 11 mentioned in this embodiment may be a battery module shown in FIG. 2, a battery pack shown in FIG. 3, or the like. Basic structural units of the battery module and the battery pack are battery cells. A plurality of battery cells are connected in series and/or in parallel by using electrode terminals, for use in various electric apparatuses. The battery module protects the battery cells against external impact, heat, vibration, and the like. A specific quantity of battery cells are electrically connected together and placed into a frame to form the battery module. The battery pack is a final state of a battery system assembled in an electric vehicle. Most existing battery packs are formed by assembling various control and protection systems such as a battery management system and a thermal management part on one or more battery modules. With the development of technologies, the battery module may be omitted, that is, the battery pack is directly formed using battery cells. With this improvement, a weight energy density and a volumetric energy density of the battery system are improved, and the number of parts is remarkably reduced.

Figure 4:
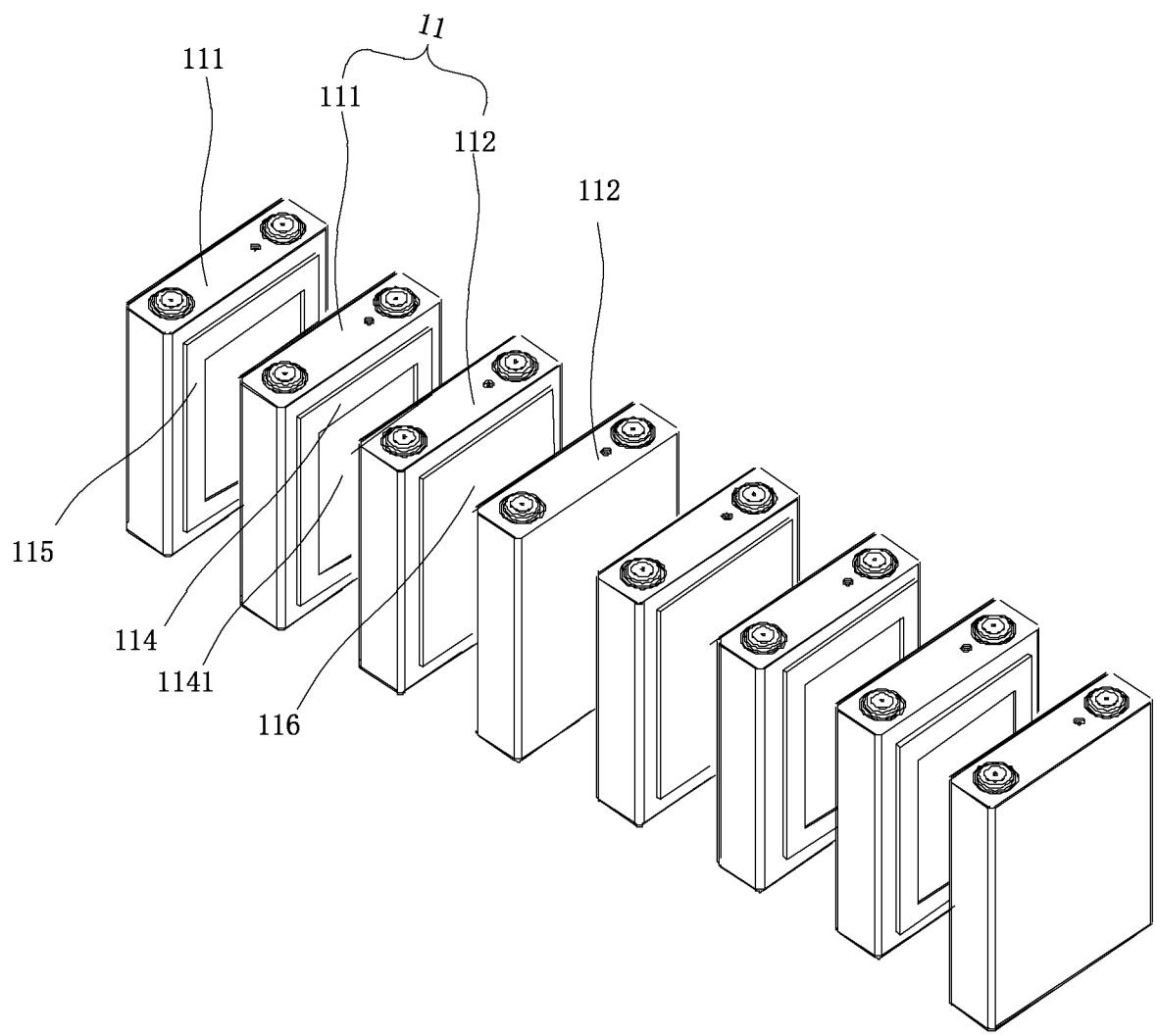
FIG. 4 is a first exploded view of a battery according to an embodiment of this application.

As shown in FIG. 4, the battery 11 in this application includes: a first battery cell 111, a second battery cell 112, and a first thermal insulation member 114, where the second battery cell 112 is disposed adjacent to the first battery cell 111, an energy density of the first battery cell 111 is greater than an energy density of the second battery cell 112, the first thermal insulation member 114 is disposed between the first battery cell 111 and the second battery cell 112, and the first thermal insulation member 114 is a flat structure. The first thermal insulation member 114 comprises a first hollow part in a center of the first thermal insulation member 114 and penetrating the first thermal insulation member 114, the first hollow part is located between the side surface of the at least one of the plurality of first battery cells and the side surface of the at least one of the plurality of second battery cells, and the first hollow part is not filled with thermal insulation material.

The first battery cell 111 and the second battery cell 112 in this application may be lithium-ion secondary batteries, lithium-ion primary batteries, lithium-sulfur batteries, sodium-lithium-ion batteries, sodium-ion batteries, magnesium-ion batteries, or the like. This is not limited in the embodiments of this application. The first battery cell 111 and the second battery cell 112 may be in a cylindrical shape, a flat body shape, a cuboid shape, or other shapes. This is not limited in the embodiments of this application. In terms of packaging modes, the first battery cell 111 and the second battery cell 112 are generally classified into three types: cylindrical battery cells, square battery cells, and soft package battery cells. This is not limited in the embodiments of this application.

As shown in FIG. 5 to FIG. 8, the first battery cell 111 generally includes an electrode assembly (not shown) and an electrolyte (not shown), where the electrode assembly includes a positive electrode plate, a negative electrode plate, and a separator disposed between the positive electrode plate and the negative electrode plate, and the first battery cell 111 operates mainly depending on movements of metal ions between the positive electrode plate and the negative electrode plate. The positive electrode plate includes a positive electrode current collector and a positive electrode active substance layer. The positive electrode active substance layer is applied on a surface of the positive electrode current collector. A current collector uncoated with the positive electrode active substance layer bulges out of a current collector coated with the positive electrode active substance layer, and the current collector uncoated with the positive electrode active substance layer is used as a positive tab. With the lithium-ion battery as an example, a material of the positive electrode current collector may be aluminum, and a positive electrode active substance may be lithium cobalt oxide, lithium iron phosphate, ternary lithium, lithium manganate oxide, or the like. The negative electrode plate includes a negative electrode current collector and a negative electrode active substance layer. The negative electrode active substance layer is applied on a surface of the negative electrode current collector. A current collector uncoated with the negative electrode active substance layer bulges out of a current collector coated with the negative electrode active substance layer, and the current collector uncoated with the negative electrode active substance layer is used as a negative tab. A material of the negative electrode current collector may be copper, and a negative electrode active substance may be carbon, silicon, or the like. To allow a large current to pass through without any fusing, a plurality of positive tabs are provided and stacked together, and a plurality of negative tabs are provided and stacked together. A material of the separator may be polypropylene (PP for short), polyethylene (PE for short), or the like. In addition, the electrode assembly may be of a winding structure or a laminated structure. There may be one or more electrode assemblies. This is not specifically limited in the embodiments of this application. The first battery cell 111 further includes a housing 1114, where the electrode assembly and the electrolyte are both packaged in the housing 1114, the housing 1114 may be a hollow cuboid, cube, or cylinder, a material of the housing 1114 may be aluminum or steel and its alloy, or may be plastic material or aluminum-plastic film. A positive electrode terminal 1112 and a negative electrode terminal 1113 are further disposed on the housing 1114, the positive tab is electrically connected to the positive electrode terminal 1112, and the negative tab is electrically connected to the negative electrode terminal 1113, so as to output electric energy.

It may be understood that the second battery cells 112 and the first battery cells 111 are the same in structure. This is not described herein again.

The battery 11 provided in this embodiment of this application includes the first battery cell 111 and the second battery cell 112, where an energy density of the second battery cell 112 is less than that of the first battery cell 111, thermal stability of the first battery cell 111 is lower than that of the second battery cell 112, and thermal failure reaction of the first battery cell 111 is more violent than that of the second battery cell 112. After thermal runaway occurs in the first battery cell 111, the first battery cell 111 generates high temperature gas, and temperature of the first battery cell 111 rises sharply. However, a first thermal insulation member 114 is disposed between the first battery cell 111 and the second battery cell 112, and the first thermal insulation member 114 can effectively delay or stop thermal transfer between the first battery cell 111 and the second battery cell 112, so as to effectively reduce a probability that the first battery cell 111 triggers chain reaction of the second battery cell 112, thereby improving use safety of the battery.

It should be noted that, because thermal stability of the first battery cell 111 is lower than thermal stability of the second battery cell 112, thermal failure usually occurs in the first battery cell 111 first. In this case, the first thermal insulation member 114 can stop heat generated by thermal failure of the first battery cell 111 from being transferred to the second battery cell 112, so as to reduce the probability that the first battery cell 111 triggers chain reaction of the second battery cell 112. However, this does not mean that thermal failure definitely occurs in the first battery cell 111 earlier than in the second battery cell 112. When external force only acts on the second battery cell 112, thermal failure may occur in the second battery cell 112 first. In this case, the first thermal insulation member 114 can also stop heat generated by thermal failure of the second battery cell 112 from being transferred to the first battery cell 111, so as to reduce the probability that the second battery cell 112 triggers chain reaction of the first battery cell 111. Herein, it is more likely that thermal failure occurs in the first battery cell 111 first, so for ease of brief description, description is provided by assuming that thermal failure occurs in the first battery cell 111 first.

In the battery of this application, the first thermal insulation member 114 includes a hollow part 1141, where in a thickness direction of the first thermal insulation member 114, the hollow part 1141 runs through the first thermal insulation member 114, and the hollow part 1141 is constructed to provide a space allowing the first battery cell 111 and/or the second battery cell 112 to swell. Therefore, when the first battery cell 111 or the second battery cell 112 swells, excess volume of the swelling first battery cell 111 or second battery cell 112 can be filled into the hollow part 1141, so as to effectively buffer swelling force of the battery 11. In some implementations, the first thermal insulation member 114 is constructed as a square frame structure, facilitating preparation of the hollow part 1141 of the first thermal insulation member 114. In some other implementations, the first thermal insulation member 114 further includes a filling member (not shown in the figure), configured to fill the hollow part 1141, where the filling member is elastic. The filling member is selected from at least one of foam, rubber, thermal insulation wool, or aerogel thermal insulation pad. Therefore, a material of the filling member may be selected based on specific factors such as type and costs of the first battery cell 111 and the second battery cell 112.

In the battery 11 in this embodiment, the first battery cell 111 and the second battery cell 112 are alternately arranged in an arrangement mode of n first battery cells 111 and m second battery cells 112, where n≥1, m≥1, and n and m are an integer each.

Figure 5:
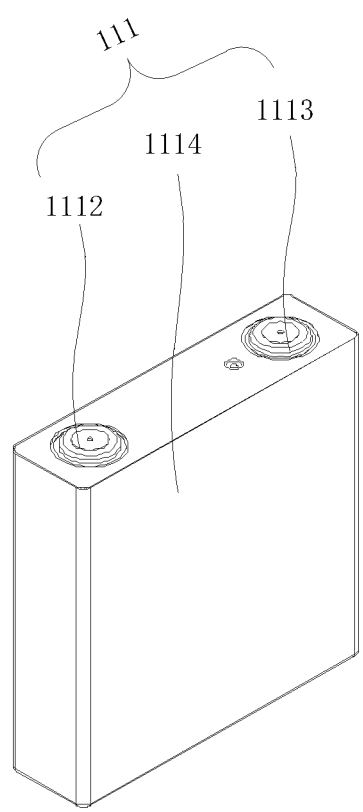
FIG. 5 is a schematic structural diagram of a battery cell according to an embodiment of this application.
Figure 6:
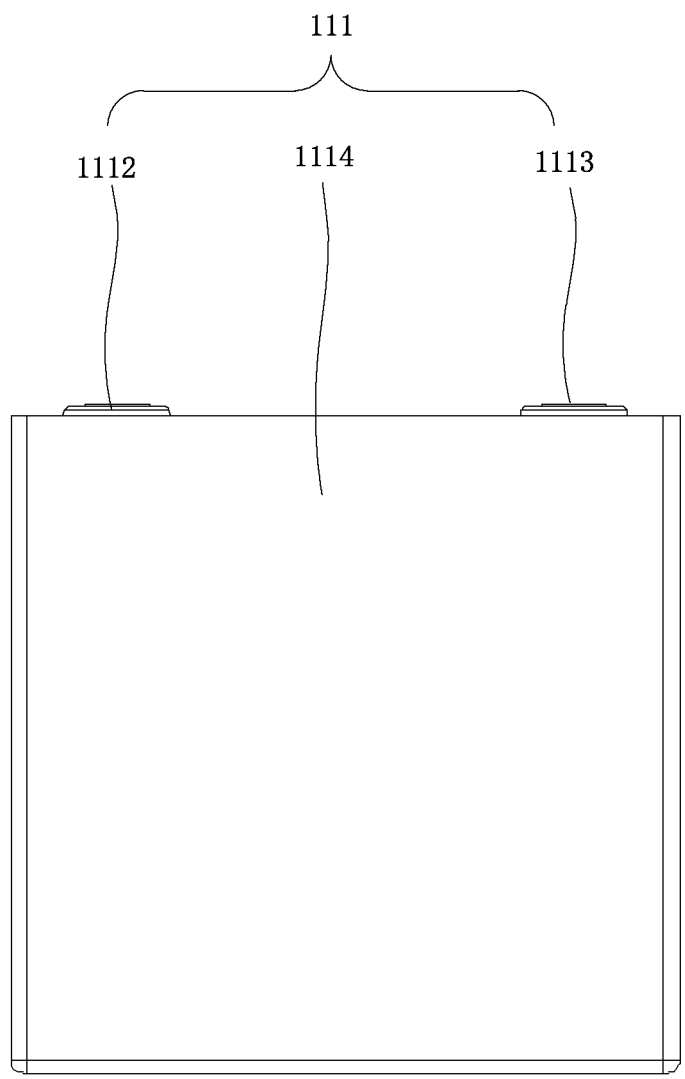
FIG. 6 is a main view of a battery cell according to an embodiment of this application.
Figure 7:
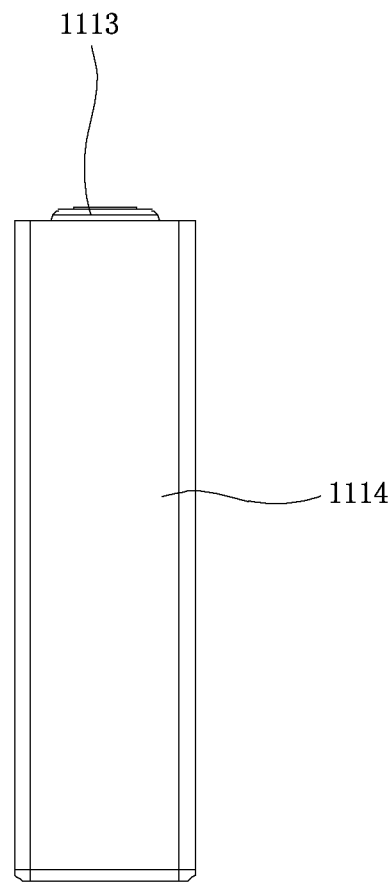
FIG. 7 is a right view of a battery cell according to an embodiment of this application.
Figure 8:
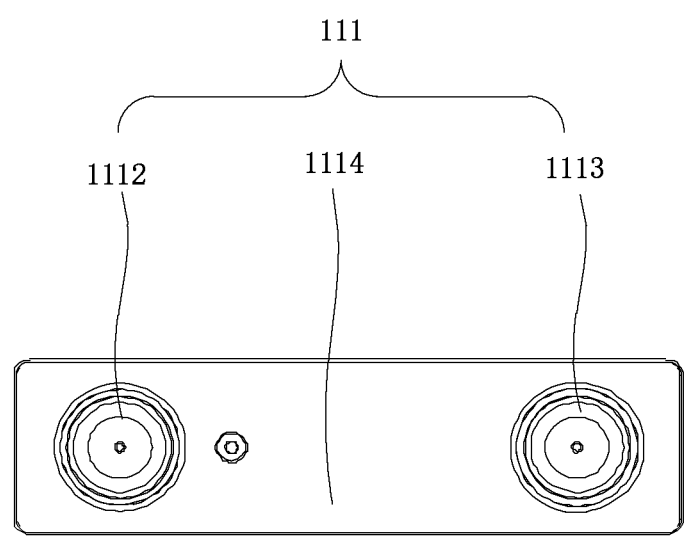
FIG. 8 is a vertical view of a battery cell according to an embodiment of this application.

Values of n and m may be the same, or may be different. For example, in some implementations, as shown in FIG. 2, FIG. 4 and FIG. 5, values of n and m are both 1, that is, n=1 and m=1. In this case, the first battery cells 111 and the second battery cells 112 are arranged alternately to form a row or a column, that is, one second battery cell 112 is disposed between the two adjacent first battery cells 111, and one first battery cell 111 is disposed between the two adjacent second battery cells 112. For another example, in some implementations, as shown in FIG. 3, values of n and m are both 6, that is, n=6 and m=6. In this case, six first battery cells 111 and six second battery cells 112 form an arrangement unit, three arrangement units are provided, the three arrangement units are arranged in a Y-axis direction shown in FIG. 3, the six first battery cells 111 and the six second battery cells 112 in each arrangement unit are arranged in an X direction shown in FIG. 3, and in the two adjacent arrangement units, the first battery cells 111 and the second battery cells 112 are arranged in a staggered manner. For another example, in some other implementations, as shown in FIG. 4, a value of n is 2, and a value of m is 2, that is, n=2 and m=2. In this case, the first battery cells 111 and the second battery cells 112 are arranged in a row or a column, with every two pairs of first battery cells 111 spaced by one pair of second battery cells 112, that is, arrangement units, each including two first battery cells 111 and two second battery cells 112, are arranged in a row or a column. It may be understood that values of n and m may alternatively be other values. This is not enumerated herein.

In some implementations, in the battery 11 of this application, the battery 11 includes at least two of the first battery cells 111, that is, n≥2, a second thermal insulation member 115 is further disposed between the two adjacent first battery cells 111. The second thermal insulation member 115 can effectively delay or stop thermal transfer between one first battery cell 111 and its adjacent first battery cell 111, so as to effectively reduce the probability that the first battery cell 111 triggers chain reaction of the adjacent first battery cell 111, thereby improving use safety of the battery 11. The second thermal insulation member 115 comprises a second hollow part in a center of the second thermal insulation member 115 and penetrating the second thermal insulation member 115, the second hollow part is not filled with thermal insulation material.

In some other implementations, in the battery 11 of this application, the battery 11 includes at least two of the second battery cells 112, that is, m≥2, a third thermal insulation member 116 is further disposed between the two adjacent second battery cells 112. The third thermal insulation member 116 can effectively delay or stop thermal transfer between one second battery cell 112 and its adjacent second battery cell 112, so as to effectively reduce the probability that the second battery cell 112 triggers chain reaction of the adjacent second battery cell 112, thereby improving use safety of the battery 11. The third thermal insulation member 116 does not comprise a hollow part.

It should be noted that, in some implementations, only the first thermal insulation member 114 may be disposed between the first battery cell 111 and the second battery cell 112. In some implementations, the first thermal insulation member 114 may be disposed between the adjacent first battery cell 111 and second battery cell 112, and the second thermal insulation member 115 is disposed between the two adjacent first battery cells 111. In some implementations, the first thermal insulation member 114 may be disposed between the adjacent first battery cell 111 and second battery cell 112, and the third thermal insulation member 116 is disposed between the two adjacent second battery cells 112. In some implementations, the second thermal insulation member 115 is disposed between the two adjacent first battery cells 111, the first thermal insulation member 114 is disposed between the adjacent first battery cell 111 and second battery cell 112, and the third thermal insulation member 116 is disposed between the adjacent second battery cells 112.

It should be noted that a structure of the second thermal insulation member 115 and a structure of the third thermal insulation member 116 may be the same as that of the first thermal insulation member 114, or may be different from that of the first thermal insulation member 114. For example, in some implementations, as shown in FIG. 4, the first thermal insulation member 114 and the second thermal insulation member 115 are constructed as a square frame structure. In some embodiments, the first thermal insulation member 114 and the second thermal insulation member 115 further include a filling member, configured to fill the hollow part, where the filling member is elastic, and the filling member is selected from at least one of foam, rubber, thermal insulation wool, or aerogel thermal insulation pad.

Figure 9:
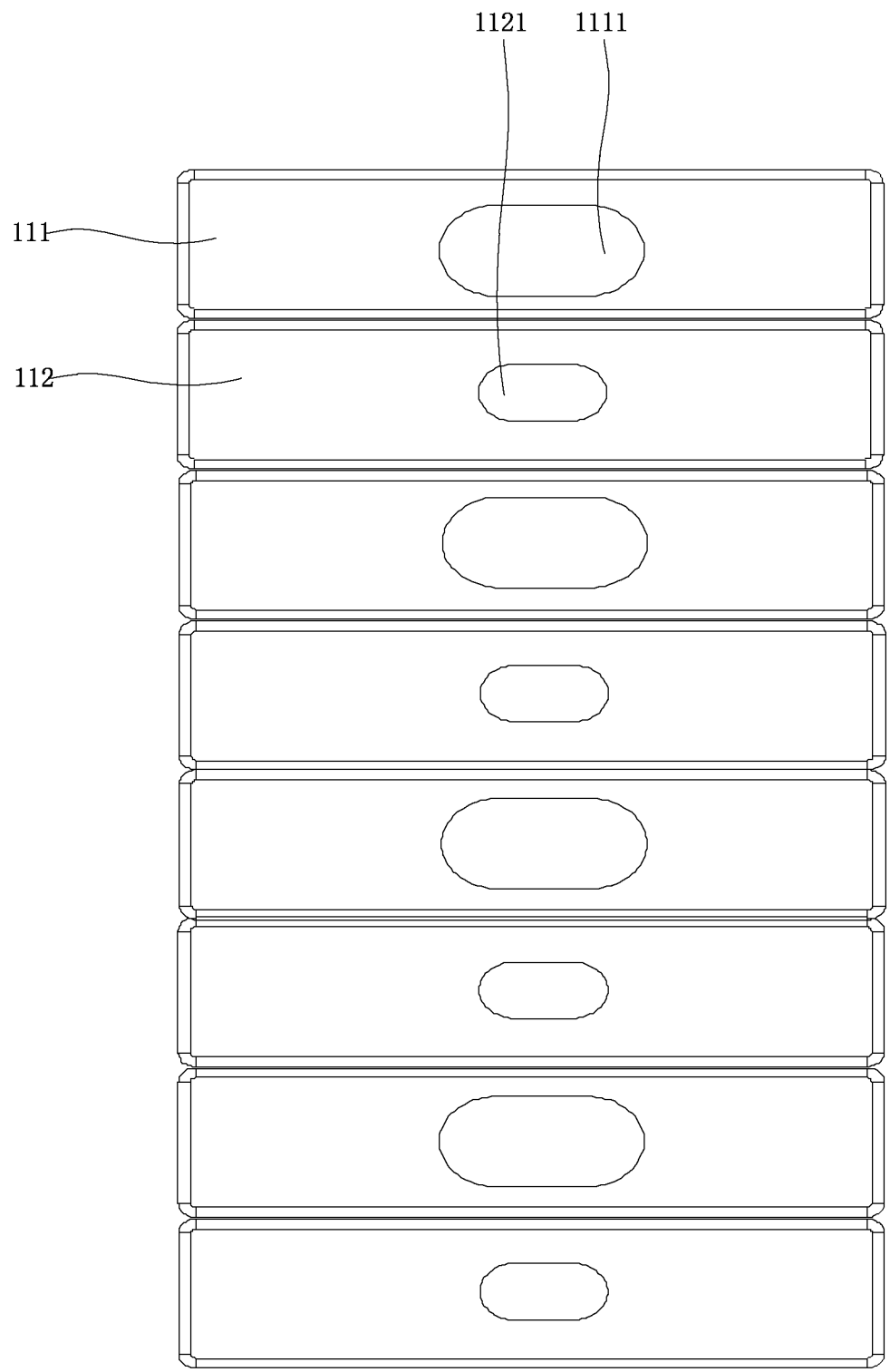
FIG. 9 is a first schematic structural diagram of a battery according to an embodiment of this application.

As shown in FIG. 9, in the battery 11 of this application, the first battery cell 111 further includes a first pressure relief mechanism 1111, where the first pressure relief mechanism 1111 is configured to be actuated when internal pressure or temperature of the first battery cell 111 reaches a threshold, to release the internal pressure of the first battery cell 111; the second battery cell 112 further includes a second pressure relief mechanism 1121, where the second pressure relief mechanism 1121 is configured to be actuated when internal pressure or temperature of the second battery cell 112 reaches a threshold, to release the internal pressure of the second battery cell 112; and an area of the first pressure relief mechanism 1111 is greater than an area of the second pressure relief mechanism 1121.

The first pressure relief mechanism 1111 is a component or part that can be actuated when internal pressure or internal temperature of the first battery cell 111 reaches a preset threshold, to release the internal pressure and/or internal substances. The first pressure relief mechanism 1111 may specifically be in a form of an explosion-proof valve, a gas valve, a pressure relief valve, a safety valve, or the like, or may specifically be a pressure-sensitive or temperature-sensitive component or structure. To be specific, when internal pressure or temperature of the first battery cell 111 reaches a preset threshold, the first pressure relief mechanism 1111 performs actions or a weak structure in the first pressure relief mechanism 1111 is broken, so as to form an opening or channel for releasing the internal pressure.

It may be understood that the second pressure relief mechanism 1121 is a component or part that can be actuated when internal pressure or internal temperature of the second battery cell 112 reaches a preset threshold, to release the internal pressure and/or internal substances. The second pressure relief mechanism 1121 may specifically be in a form of an explosion-proof valve, a gas valve, a pressure relief valve, a safety valve, or the like, or may specifically be a pressure-sensitive or temperature-sensitive component or structure. To be specific, when internal pressure or temperature of the second battery cell 112 reaches a preset threshold, the second pressure relief mechanism 1121 performs actions or a weak structure in the second pressure relief mechanism 1121 is broken, so as to form an opening or channel for releasing the internal pressure.

The threshold in this application may be a pressure threshold or a temperature threshold. Design of the threshold varies depending on different design demands. For example, the threshold may be designed or determined based on an internal pressure or internal temperature value of the first battery cell 111 that is considered as having a danger or runaway risk. In addition, the threshold may, for example, depend on the material of one or more of a positive electrode plate, a negative electrode plate, an electrolyte, and a separator in the first battery cell 111. For another example, the threshold may be designed or determined based on an internal pressure or internal temperature value of the second battery cell 112 that is considered as having a danger or runaway risk. In addition, the threshold may, for example, depend on the material of one or more of a positive electrode plate, a negative electrode plate, an electrolyte, and a separator in the second battery cell 112.

The term "actuate" mentioned in this application means that the first pressure relief mechanism 1111 performs actions or is activated to a specific state, so that internal pressure of the first battery cell 111 can be released, and that the second pressure relief mechanism 1121 performs actions or is activated to a specific state, so that internal pressure of the second battery cell 112 can be released. The actions generated by the first pressure relief mechanism 1111 may include but are not limited to: rupturing, breaking, tearing, or opening at least part of the first pressure relief mechanism 1111. When the first pressure relief mechanism 1111 is actuated, high-temperature and high-pressure substances in the first battery cell 111 are discharged as emissions out of the actuated part. In this way, the first battery cell 111 can release pressure in the case of controllable pressure or temperature, thereby avoiding potential and more serious accidents. The emissions from the first battery cell 111 mentioned in this application include but are not limited to: electrolyte, fragments of positive and negative electrode plates and separator because of dissolution or breaking, high-temperature and high-pressure gas and flames generated by reactions, and the like. The high-temperature and high-pressure emissions are discharged towards a direction in which the first pressure relief mechanism 1111 is disposed on the first battery cell 111, and more specifically, may be discharged towards a direction of an actuated region of the first pressure relief mechanism 1111. Power and destructive impact of the emissions may be quite large, and even may be large enough to break through one or more parts in this direction. Likewise, the actions generated by the second pressure relief mechanism 1121 may include but are not limited to: rupturing, breaking, tearing, or opening at least part of the second pressure relief mechanism 1121. When the second pressure relief mechanism 1121 is actuated, high-temperature and high-pressure substances in the second battery cell 112 are discharged as emissions out of the actuated part. In this way, the second battery cell 112 can release pressure in the case of controllable pressure or temperature, thereby avoiding potential and more serious accidents. The emissions from the second battery cell 112 mentioned in this application include but are not limited to: electrolyte, fragments of positive and negative electrode plates and separator because of dissolution or breaking, high-temperature and high-pressure gas and flames generated by reactions, and the like. The high-temperature and high-pressure emissions are discharged towards a direction in which the second pressure relief mechanism 1121 is disposed on the second battery cell 112, and more specifically, may be discharged towards a direction of an actuated region of the second pressure relief mechanism 1121. Power and destructive impact of the emissions may be quite large, and even may be large enough to break through one or more parts in this direction.

In the first battery cell 111, the first pressure relief mechanism 1111 may be disposed in any position of the housing 1114. For example, the first pressure relief mechanism 1111 may be disposed on the top, the bottom, or a side of the housing 1114, or the first pressure relief mechanism 1111 may be disposed between the positive electrode terminal 1112 and the negative electrode terminal 1113. This is not specifically limited in this application, as long as the internal pressure of the first battery cell 111 can be released. Likewise, the second pressure relief mechanism 1121 disposed on the second battery cell 112 may be similar to the first pressure relief mechanism 1111 disposed on the first battery cell 111. Details are not described herein again.

In some implementations, the ratio of the energy density $E_1$ of the first battery cell 111 to the energy density $E_2$ of the second battery cell 112 satisfies: $1.26 \leq E_1/E_2 \leq 2.14$. The energy density refers to energy released per unit mass or unit volume by the battery, namely a weight energy density or a volumetric energy density. In some implementations, the first battery cell 111 is, for example, a ternary lithium battery, such as a lithium nickel cobalt manganate battery or a lithium nickel cobalt aluminate battery. The second battery cell 112 is, for example, a lithium iron phosphate battery or a lithium cobalt oxide battery. It should be noted that an energy density of the first battery cell 111 is greater than an energy density of the second battery cell 112, and thermal failure reaction of the first battery cell 111 is usually more violent than failure reaction of the second battery cell 112. The first battery cell 111 and the second battery cell 112 are arranged simultaneously, helping reduce chain reaction of thermal failure and relieve thermal diffusion, and further improving use safety of the battery 11.

In some implementations, a ratio of an area $A_1$ of the first pressure relief mechanism 1111 to an area $A_2$ of the second pressure relief mechanism 1121 satisfies: $1.5 \leq A_1/A_2 \leq 4$, so that the first battery cell 111 and the second battery cell 112 both can effectively release energy in a timely manner, thereby improving use safety of the battery.

In the battery 11 provided in this embodiment of this application, the first pressure relief mechanism 1111 is disposed on the first battery cell 111, so that when internal pressure or temperature of the first battery cell 111 reaches a threshold, the first battery cell 111 can release the internal pressure; and the second pressure relief mechanism 1121 is disposed on the second battery cell 112, so that when internal pressure or temperature of the second battery cell 112 reaches a threshold, the second battery cell 112 can also release the internal pressure. An energy density of the first battery cell 111 is greater than an energy density of the second battery cell 112, and thermal failure reaction of the first battery cell 111 is more violent than thermal failure reaction of the second battery cell 112. The area of the first pressure relief mechanisms 1111 is limited to be greater than the area of the second pressure relief mechanisms 1121, so that the first battery cell 111 with more violent failure reaction can effectively release pressure in a timely manner by using the first pressure relief mechanism 1111 with a larger area, so as to effectively reduce the probability that the first battery cell 111 causes chain reaction due to failure to release the internal pressure in a timely manner, thereby improving overall use safety of the battery 11.

Figure 10:
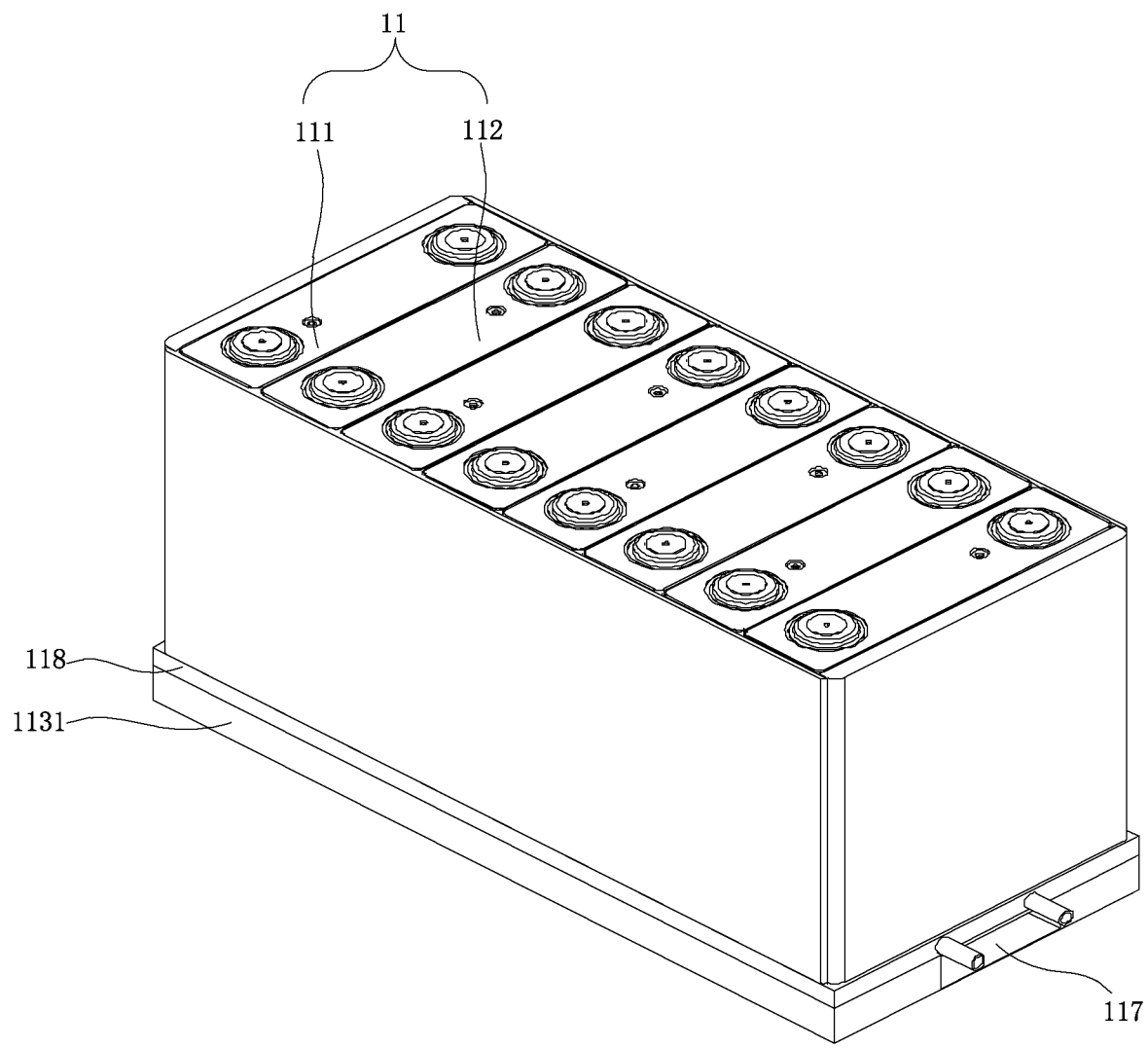
FIG. 10 is a second schematic structural diagram of a battery according to an embodiment of this application.

As shown in FIG. 10, the battery 11 in the embodiments of this application further includes a discharge channel 117, where the discharge channel 117 is disposed facing the first pressure relief mechanism 1111 and/or the second pressure relief mechanism 1121, and the discharge channel 117 is configured to collect emissions from the first battery cell 111 when the first pressure relief mechanism 1111 is actuated, and/or collect emissions from the second battery cell 112 when the second pressure relief mechanism 1121 is actuated. The discharge channel is disposed, allowing timely release of the internal pressure of the first battery cell 111 and/or the second battery cell 112 when the internal pressure or temperature of the first battery cell 111 and/or the second battery cell 112 reaches a threshold, making the battery 11 safer to use.

Figure 12A:
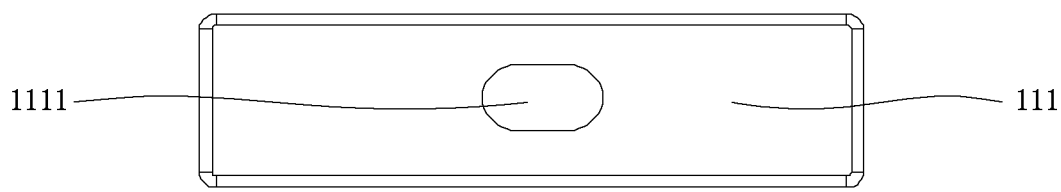
FIG. 12a is a schematic structural diagram of a first battery cell according to an embodiment of this application.

In some implementations, the discharge channel 117 is disposed facing the first pressure relief mechanism 1111, and the discharge channel 117 is configured to collect emissions from the first battery cell 111 when the first pressure relief mechanism 1111 is actuated. In some implementations, the discharge channel 117 is disposed facing the second pressure relief mechanism 1121, and the discharge channel 117 is configured to collect emissions from the second battery cell 112 when the second pressure relief mechanism 1121 is actuated. In some other implementations, as shown in FIG. 10, the discharge channel 117 is disposed facing both the first pressure relief mechanism 1111 of the first battery cell 111 and the second pressure relief mechanism 1121 of the second battery cell 112, and the discharge channel 117 is configured to collect emissions from the first battery cell 111 and the second battery cell 112 when the first pressure relief mechanism 1111 and the second pressure relief mechanism 1121 are actuated. Correspondingly, the first pressure relief mechanism 1111 of the first battery cell 111 is arranged right in the middle, as shown in FIG. 12*a*. Likewise, the second pressure relief mechanism 1121 of the second battery cell 112 is also arranged right in the middle.

Figure 11:
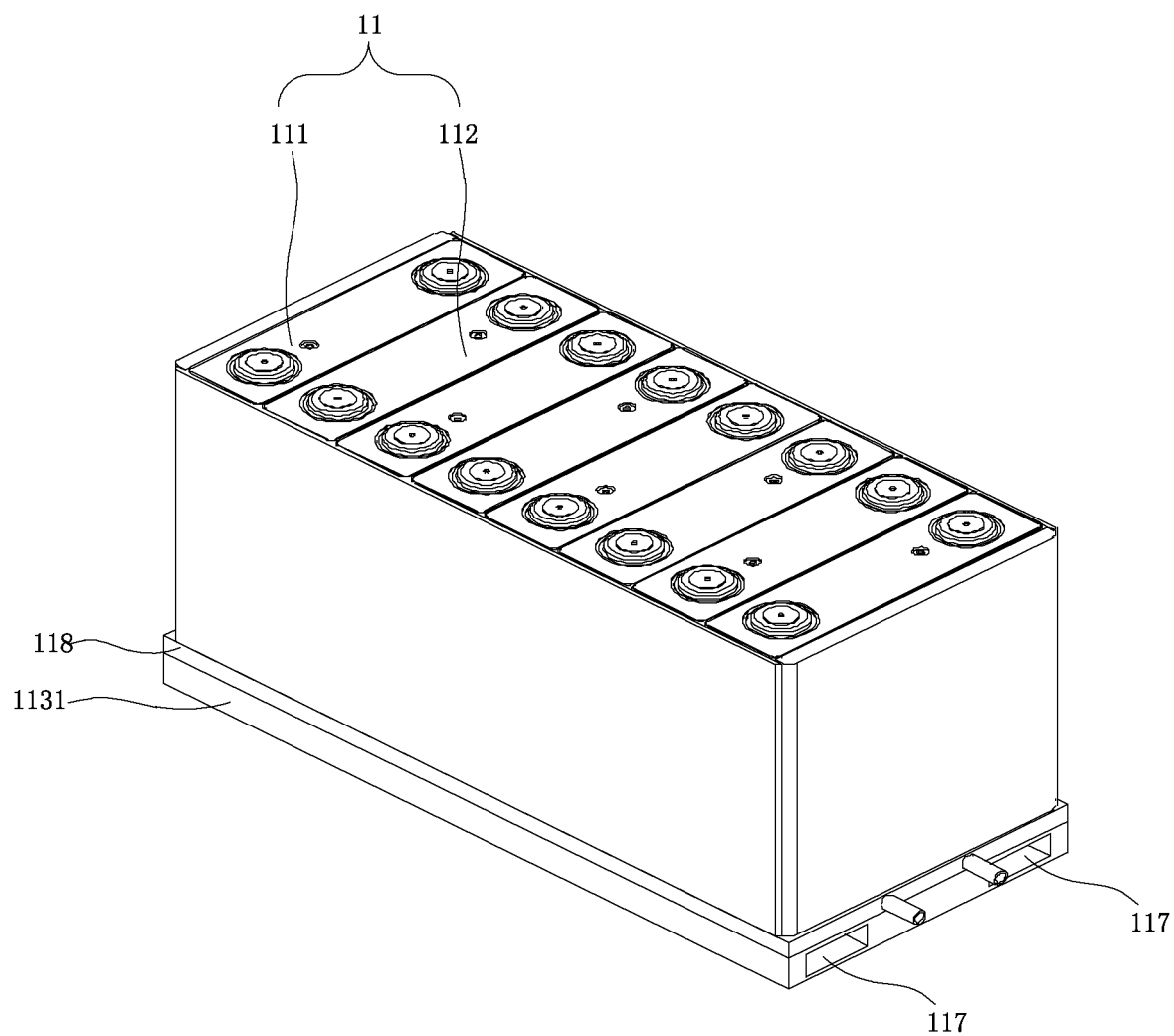
FIG. 11 is a third schematic structural diagram of a battery according to an embodiment of this application.

In an implementation shown in FIG. 11, the battery 11 includes at least two of the discharge channels 117, the discharge channels 117 are spaced apart from each other, and the first pressure relief mechanism 1111 and the second pressure relief mechanism 1121 are disposed facing the different discharge channels 117 respectively. For example, the first battery cells 111 and the second battery cells 112 are arranged in a column, and the first battery cells 111 and the second battery cells 112 may have substantially the same length and width, and may have the same thickness or different thicknesses. In addition, a distance from the first pressure relief mechanism 1111 on the first battery cell 111 to a side edge of the first battery cell 111 is one fourth of the width of the first battery cell 111, and a distance from the second pressure relief mechanism 1121 on the second battery cell 112 to a side edge of the second battery cell 112 is one fourth of the width of the second battery cell 112. The first pressure relief mechanism 1111 and the second pressure relief mechanism 1121 are not colinear, that is, the first pressure relief mechanism 1111 on the first battery cell 111 and the second pressure relief mechanism 1121 on the second battery cell 112 are staggered in an arrangement direction of the first battery cell 111 and the second battery cell 112. In this way, when internal pressure or temperature of the first battery cell 111 reaches a threshold, emissions in the first battery cell 111 are discharged via one of the discharge channels 117, and when internal pressure or temperature of the second battery cell 112 reaches a threshold, emissions in the second battery cell 112 are discharged via one of the discharge channels 117, so that the emissions from the first battery cell 111 and the second battery cells 112 can all be effectively discharged out of the battery 11 in a timely manner, thereby improving use safety of the battery 11.

Figure 12B:
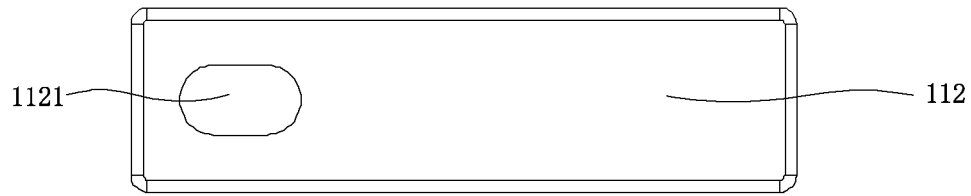
FIG. 12b is a schematic structural diagram of a second battery cell according to an embodiment of this application.

Certainly, in an alternative implementation of the foregoing implementation, as shown in FIG. 12*a* and FIG. 12*b*, a distance from the first pressure relief mechanism 1111 on the first battery cell 111 to a side edge of the first battery cell 111 is one half of the width of the first battery cell 111, and a distance from the second pressure relief mechanism 1121 on the second battery cell 112 to a side edge of the secondary battery cell 112 is one fourth of the width of the second battery cell 112. In this case, the first pressure relief mechanism 1111 on the first battery cell 111 and the second pressure relief mechanism 1121 on the second battery cell 112 are not colinear, that is, the first pressure relief mechanism 1111 on the first battery cell 111 and the second pressure relief mechanism 1121 on the second battery cell 112 are staggered in an arrangement direction of the first battery cell 111 and the second battery cell 112.

In some implementations, the battery 11 includes at least two of the first battery cells 111, and the first pressure relief mechanisms 1111 of the two adjacent first battery cells 111 are disposed facing the different discharge channels 117 respectively. Therefore, the different first battery cells 111 can discharge emissions via the different discharge channels 117 respectively, so that the emissions from the first battery cells 111 can be effectively discharged out of the battery 11 in a timely manner. In addition, thermal failure of one first battery cell 111 caused by thermal failure of the adjacent first battery cell 111 can be effectively reduced, thereby relieving chain reaction and improving use safety of the battery 11.

In some implementations, the battery 11 includes at least two of the second battery cells 112, and the second pressure relief mechanisms 1121 of the two adjacent second battery cells 112 are disposed facing the different discharge channels 117 respectively. Therefore, the different second battery cells 112 can discharge emissions via the different discharge channels 117 respectively, so that the emissions from the second battery cells 112 can be effectively discharged out of the battery 11 in a timely manner. In addition, thermal failure of the adjacent second battery cell 112 caused by thermal failure of one second battery cell 112 can be effectively reduced, so as to relieve chain reaction, thereby improving use safety of the battery 11.

Figure 13:
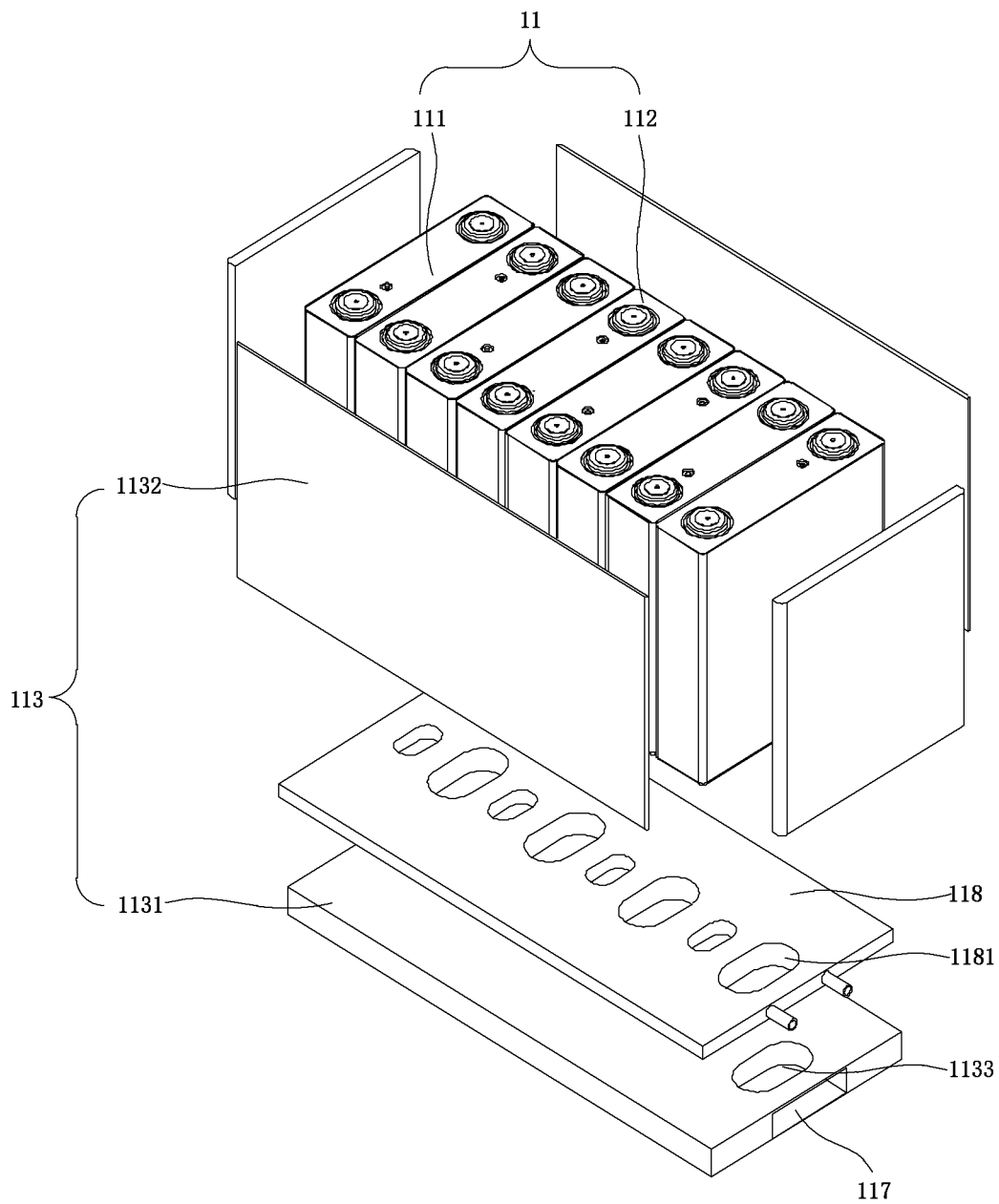
FIG. 13 is a second exploded view of a battery according to an embodiment of this application.
Figure 14:
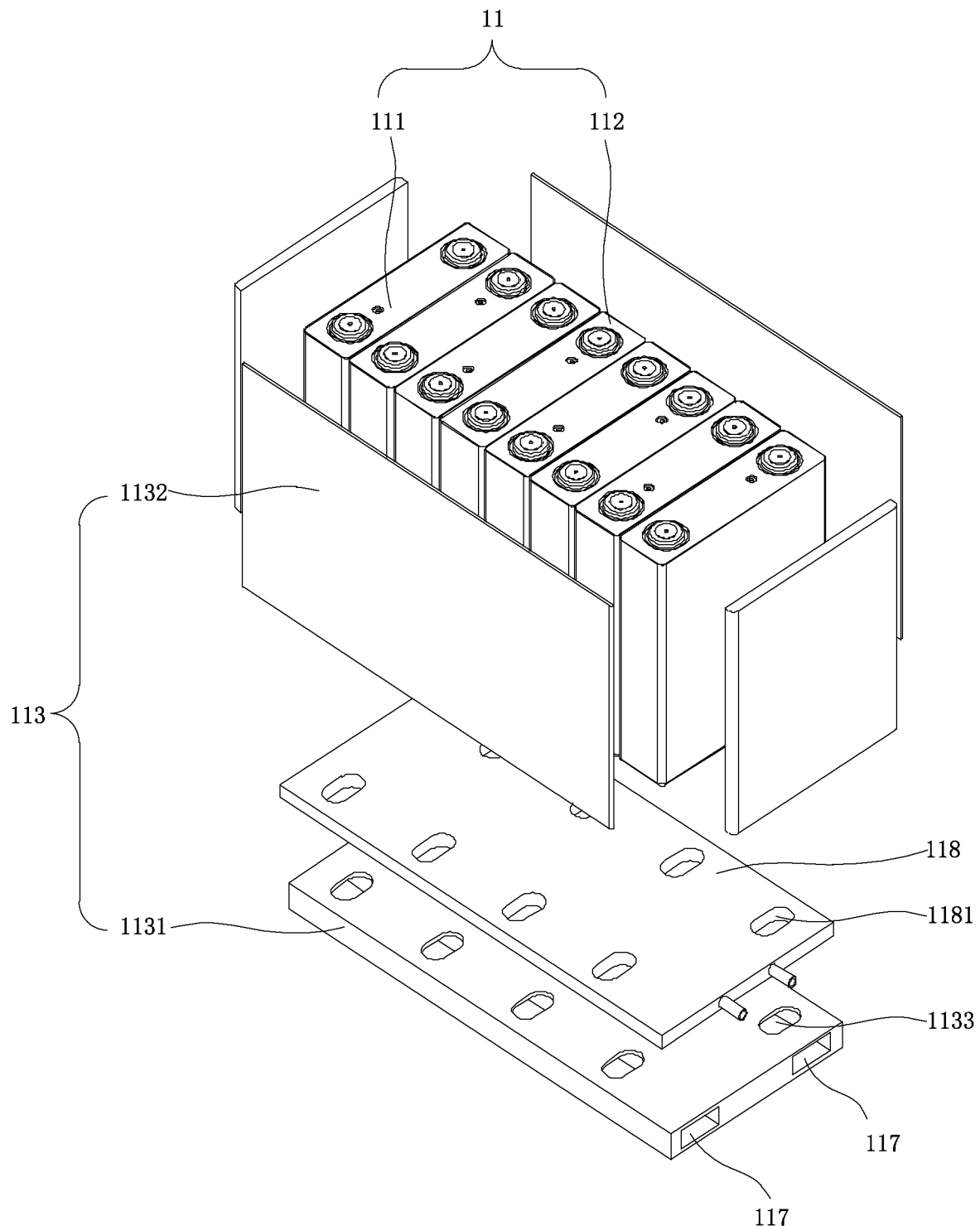
FIG. 14 is a third exploded view of a battery according to an embodiment of this application.

In some implementations, as shown in FIG. 13 and FIG. 14, the battery 11 further includes a box body 113. The box body 113 has a plurality of walls, the plurality of walls are configured to enclose an accommodating cavity for accommodating the first battery cell 111 and the second battery cell 112, a hollow chamber is provided in at least one of the plurality of walls, and the hollow chamber is configured to form the discharge channel 117. The box body 113 may be sealed or unsealed. In a specific example, the box body 113 includes a top wall (not shown) located on the top, a bottom wall 1131 located on the lower side, and an annular side wall 1132 located on a periphery of the bottom wall 1131, where the top wall and the bottom wall 1131 cover openings of two ends of the side wall 1132 respectively, so as to enclose the accommodating cavity together with the side wall 1132. Certainly, the side wall 1132 may be formed by connecting four secondary side walls end to end, or may be an integrated part. The box body 113 is configured to protect the first battery cell 111 and the second battery cell 112 that are placed in the accommodating cavity. The hollow chamber for forming the discharge channel 117 is provided in at least one of the plurality of walls of the box body 113. This allows the first pressure relief mechanism 1111 of the first battery cell 111 and the second pressure relief mechanism 1121 of the second battery cell 112 to be disposed facing the corresponding hollow cavity, so that when internal pressure or temperature of the first battery cell 111 reaches a threshold, emissions from the first battery cell 111 can be discharged into the hollow cavity, and when internal pressure or temperature of the second battery cell 112 reaches a threshold, emissions from the second battery cell 112 can be discharged into the hollow cavity, so as to effectively reduce a risk of fire and explosion, thereby improving use safety of the battery 11.

Further, the bottom wall 1131 is configured to support the first battery cell 111 and the second battery cell 112, and the hollow chamber is provided in the bottom wall 1131. Correspondingly, the first pressure relief mechanism 1111 of the first battery cell 111 and the second pressure relief mechanism 1121 of the second battery cell 112 are disposed at the bottom of their respective housings 1114. Therefore, emissions in the first battery cell 111 are discharged downwards and enter the hollow chamber at the bottom via the first pressure relief mechanism 1111, and emissions in the second battery cell 112 are discharged downwards and enter the hollow chamber at the bottom via the second pressure relief mechanism 1121. With this arrangement mode of the battery 11, after the battery 11 is placed in a battery compartment of a vehicle 1, the battery 11 can discharge emissions to the bottom of the vehicle 1 rather than discharging emissions to a passenger compartment that is located above the battery compartment, thereby further improving use safety of the battery 11.

In some implementations, to allow the emissions from the first battery cell 111 and the second battery cell 112 to be effectively discharged into the discharge channel 117 in a timely manner, the first pressure relief mechanism 1111 of the first battery cell 111 and the second pressure relief mechanism 1121 of the second battery cell 112 are configured to be capable of communicating with the corresponding discharge channel 117. A communication mode of the first pressure relief mechanism 1111 of the first battery cell 111 and the hollow chamber for forming the discharge channel 117 on the box body 113 and a communication mode of the second pressure relief mechanism 1121 of the second battery cell 112 and the hollow chamber for forming the discharge channel 117 on the box body 113 are described in the following two implementations. It should be noted that the following two implementations are merely examples of two feasible implementations, but not to limit the communication mode of the first pressure relief mechanism 1111 of the first battery cell 111 and the hollow chamber and the communication mode of the second pressure relief mechanism 1121 of the second battery cell 112 and the hollow cavity.

In an implementation, at least one wall of the box body 113 of the battery 11 is constructed to be broken when the first pressure relief mechanism 1111 is actuated, to allow the emissions from the first battery cell 111 to pass through the at least one wall and enter the corresponding discharge channel 117. In other words, the hollow chamber is provided in the at least one wall of the box body 113 that may be the top wall, the bottom wall 1131, or the side wall 1132. A part of the box body 113 facing the first pressure relief mechanism 1111 of the first battery cell 111 has a complete wall surface when the first pressure relief mechanism 1111 is not actuated, that is, a part of the box body 113 facing the first pressure relief mechanism 1111 of the first battery cell 111 does not have a hole structure communicating with the hollow chamber when the first pressure relief mechanism 1111 is not actuated. However, when internal pressure or temperature of the first battery cell 111 reaches a threshold, the first pressure relief mechanism 1111 of the first battery cell 111 is actuated, and the emissions in the first battery cells 111 are discharged, the discharged emissions of the first battery cell 111 may act on the at least one wall of the box body 113 and cause the part of the box body 113 facing the first pressure relief mechanism 1111 of the first battery cell 111 to be broken (damaged or ruptured), so that the interior of the hollow chamber of the box body 113 communicates with the first pressure relief mechanism 1111. In this way, the emissions in the first battery cell 111 can be effectively discharged into the discharge channel 117 in a timely manner. Likewise, the at least one wall of the box body 113 of the battery 11 is constructed to be broken when the second pressure relief mechanism 1121 is actuated, allowing the emissions from the second battery cell 112 to pass through the at least one wall and enter the corresponding discharge channel 117. The communication mode of the second pressure relief mechanism 1121 of the second battery cell 112 and the hollow chamber is the same as the communication mode of the first pressure relief mechanism 1111 of the first battery cell 111 and the hollow cavity. Details are not described herein again.

In another implementation, a first through-hole 1133 is provided in at least one wall of the box body 113 of the battery 11 that may be the top wall, the bottom wall 1131, or the side wall 1132. The first through-hole 1133 is constructed to communicate with the discharge channel 117, to allow the emissions from the first battery cell 111 to enter the discharge channel 117 via the first through-hole 1133 when the first pressure relief mechanism 1111 is actuated. When internal pressure or temperature of the first battery cell 111 reaches a threshold, the first pressure relief mechanism 1111 of the first battery cell 111 is actuated, and the emissions in the first battery cell 111 are discharged, the discharged emissions of the first battery cell 111 enter the hollow chamber of the box body 113 via the first through-hole 1133. In this way, the emissions in the first battery cell 111 can be effectively discharged into the discharge channel 117 in a timely manner. Likewise, a first through-hole 1133 is provided in at least one wall of the box body 113 of the battery 11 that may be the top wall, the bottom wall 1131, or the side wall 1132. The first through-hole 1133 is constructed to communicate with the discharge channel 117, to allow the emissions from the second battery cell 112 to enter the discharge channel 117 via the first through-hole 1133 when the second pressure relief mechanism 1121 is actuated. The communication mode of the second pressure relief mechanism 1121 of the second battery cell 112 and the hollow chamber is the same as the communication mode of the first pressure relief mechanism 1111 of the first battery cell 111 and the hollow cavity. Details are not described herein again.

The battery 11 further includes a thermal management part 118, configured to accommodate fluid to adjust temperature of the first battery cell 111 and the second battery cell 112. The thermal management part 118 is disposed between the first battery cell 111 and second battery cell 112 and the at least one wall. With arrangement of the thermal management part 118, temperature of the first battery cell 111 and the second battery cell 112 can be adjusted, so that the first battery cell 111 and the second battery cell 112 can be more efficiently and safely charged and discharged. The fluid herein may be liquid or gas. To adjust temperature means to heat or cool the first battery cell 111 and the second battery cell 112. In a case of cooling or lowering temperature of the first battery cell 111 and the second battery cell 112, the thermal management part 118 is configured to accommodate cooling fluid to lower temperature of the first battery cell 111 and the second battery cell 112. In this case, the thermal management part 118 may also be referred to as a cooling part, a cooling system, a cooling plate, or the like, and the fluid accommodated therein may also be referred to as a cooling medium or cooling fluid, and more specifically, cooling liquid or cooling gas. In addition, the thermal management part 118 may also be configured to accommodate heating fluid to raise temperature of the first battery cell 111. This is not limited in the embodiments of this application. In some embodiments, the fluid may circulate, to implement a better temperature adjustment effect. In some embodiments, the fluid may be water, mixed liquid of water and glycol, air, or the like.

The thermal management part 118 is constructed to be broken (damaged or ruptured) when the first pressure relief mechanism 1111 and/or the second pressure relief mechanism 1121 is actuated, to allow the fluid to flow out. To be specific, with the thermal management part 118, when internal pressure or temperature of the first battery cell 111 and the second battery cell 112 reaches a threshold and a high-temperature and high-pressure gas needs to be released, emissions released by the first battery cell 111 and the second battery cell 112 act on the thermal management part 118 to damage the thermal management part 118, so that the emissions from the first battery cell 111 and the second battery cell 112 can enter the discharge channel 117 (that is, the hollow chamber of the box body 113) via the damaged thermal management part 118. In addition, because the thermal management part 118 is damaged, the outflowing fluid such as cooling liquid absorbs a large amount of heat and is evaporated, so as to rapidly lower internal temperature of the battery 11, thereby helping relieve chain reaction of thermal failure, and improving use safety of the battery 11.

For example, as shown in FIG. 13 and FIG. 14, the thermal management part 118 is, for example, a water-cooled plate, a fluid channel is provided in the water-cooled plate, one end of the fluid channel forms a water inlet, and the other end of the fluid channel forms a water outlet. When the first battery cell 111 and the second battery cell 112 operate properly, water temperature in the water-cooled plate is adjusted to adjust ambient temperature of the first battery cell 111 and the second battery cell 112, so that the first battery cell 111 and the second battery cell 112 are charged and discharged within an appropriate temperature range, thereby improving charging efficiency and discharging efficiency of the battery 11. When thermal failure occurs in the first battery cell 111, or thermal failure occurs in the second battery cell 112, or thermal failure occurs in both the first battery cell 111 and the second battery cell 112, internal pressure released by the first battery cell 111 and the second battery cell 112 damages the water-cooled plate, so that water in the water-cooled plate is evaporated to absorb heat of high-temperature gas released by the first battery cell 111 and the second battery cell 112, further reducing the probability of fire and explosion of the first battery cell 111 and the second battery cell 112, and improving use safety of the battery 11.

In some embodiments, a second through-hole 1181 is provided in the thermal management part 118, and the second through-hole 1181 can be constructed to communicate with the discharge channel 117, to allow the emissions from the first battery cell 111 and/or the second battery cell 112 to enter the corresponding discharge channel 117 via the second through-hole 1181 when the first pressure relief mechanism 1111 and/or the second pressure relief mechanism 1121 is actuated. In some embodiments, an area of the second through-hole 1181 may be set to be greater than or equal to an area of the first pressure relief mechanism 1111 disposed on the first battery cell 111, and/or greater than or equal to an area of the second pressure relief mechanism 1121 disposed on the second battery cell 112. Therefore, when internal pressure or temperature of the first battery cell 111 reaches a threshold, the first pressure relief mechanism 1111 of the first battery cell 111 is actuated, and the emissions in the first battery cell 111 are discharged, the discharged emissions of the first battery cell 111 can rapidly and smoothly enter the discharge channel 117 (that is, the hollow chamber of the box body 113) via the second through-hole 1181, so that the emissions in the first battery cell 111 can be effectively discharged into the discharge channel 117 in a timely manner. Likewise, when internal pressure or temperature of the second battery cell 112 reaches a threshold, the second pressure relief mechanism 1121 of the second battery cell 112 is actuated, and the emissions in the second battery cell 112 are discharged, the discharged emissions of the second battery cell 112 can rapidly and smoothly enter the discharge channel 117 (that is, the hollow chamber of the box body 113) via the second through-hole 1181, so that the emissions in the second battery cell 112 can be effectively discharged into the discharge channel 117 in a timely manner.

Further, a first through-hole 1133 is provided in at least one wall of the box body 113, and the first through-hole 1133 is constructed to communicate with the discharge channel 117. In this case, the second through-hole 1181 communicates with the discharge channel 117 via the first through-hole 1133. The emissions discharged by the first battery cell 111 and/or the second battery cell 112 enter the discharge channel 117 (that is, the hollow chamber of the box body 113) via the second through-hole 1181 and the first through-hole 1133 in sequence. In this way, the emissions in the first battery cell 111 and the second battery cell 112 can be effectively discharged into the discharge channel 117 in a timely manner.

Figure 15:
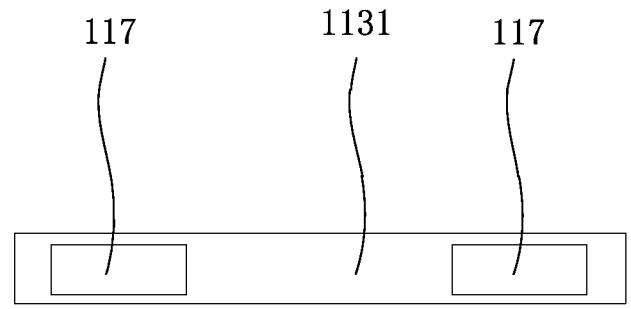
FIG. 15 is a first schematic structural diagram of a bottom wall according to an embodiment of this application.
Figure 16:
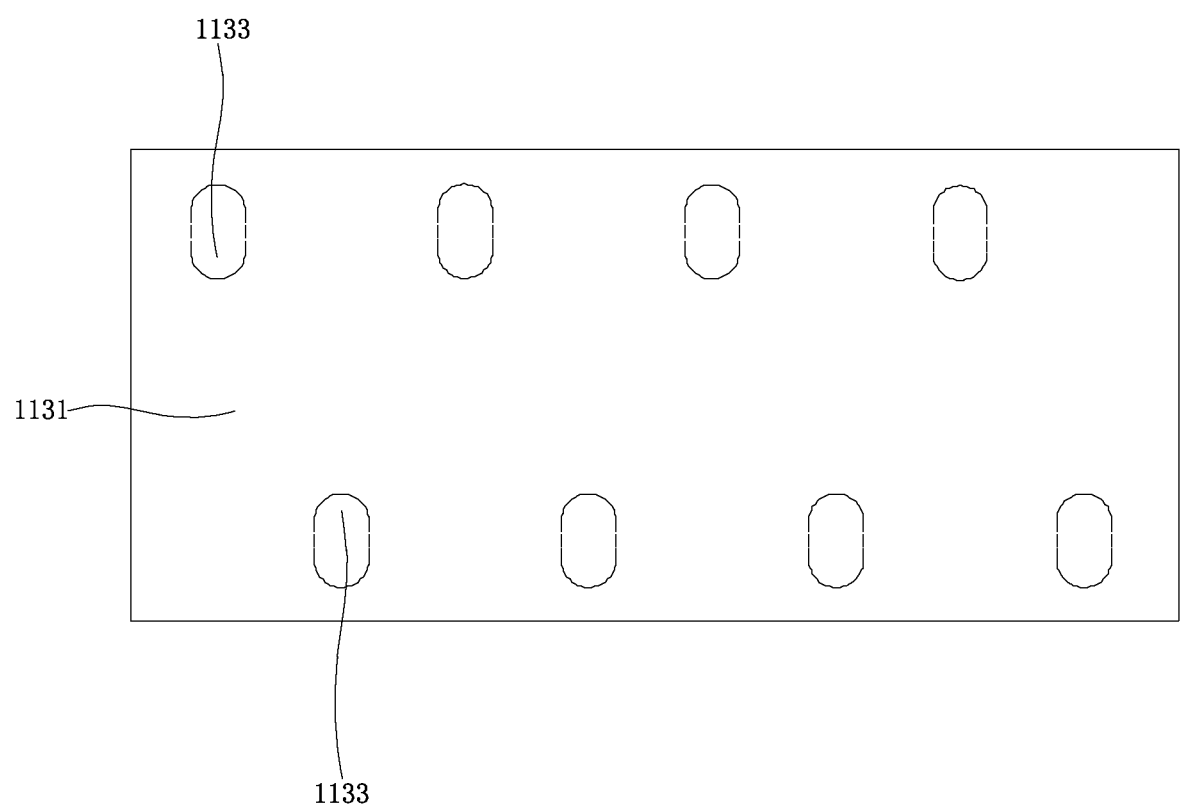
FIG. 16 is a second schematic structural diagram of a bottom wall according to an embodiment of this application.
Figure 17:
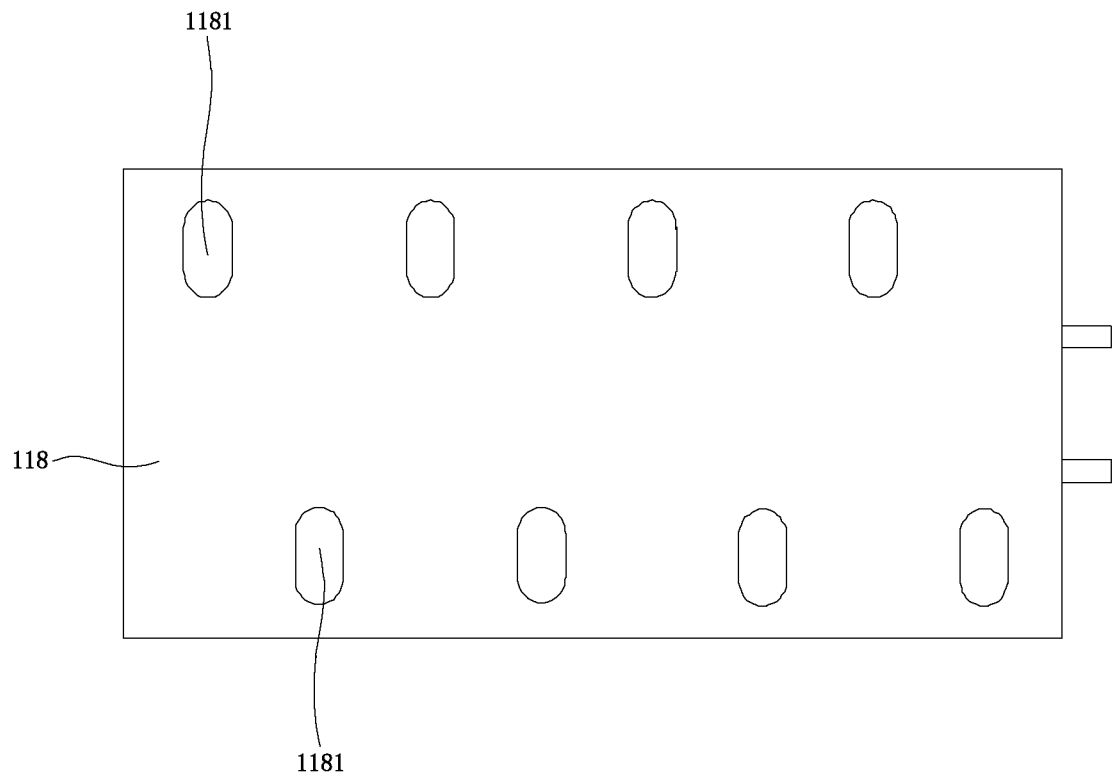
FIG. 17 is a schematic structural diagram of a thermal management part according to an embodiment of this application.
Figure 18:
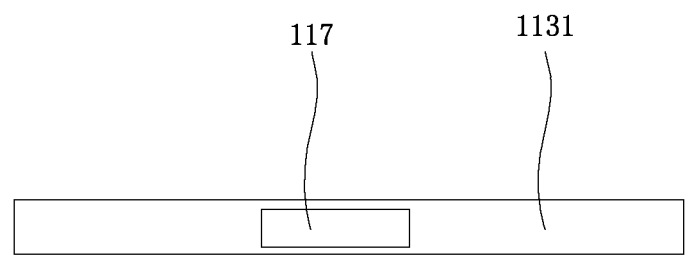
FIG. 18 is a first schematic structural diagram of a bottom wall according to another embodiment of this application.
Figure 19:
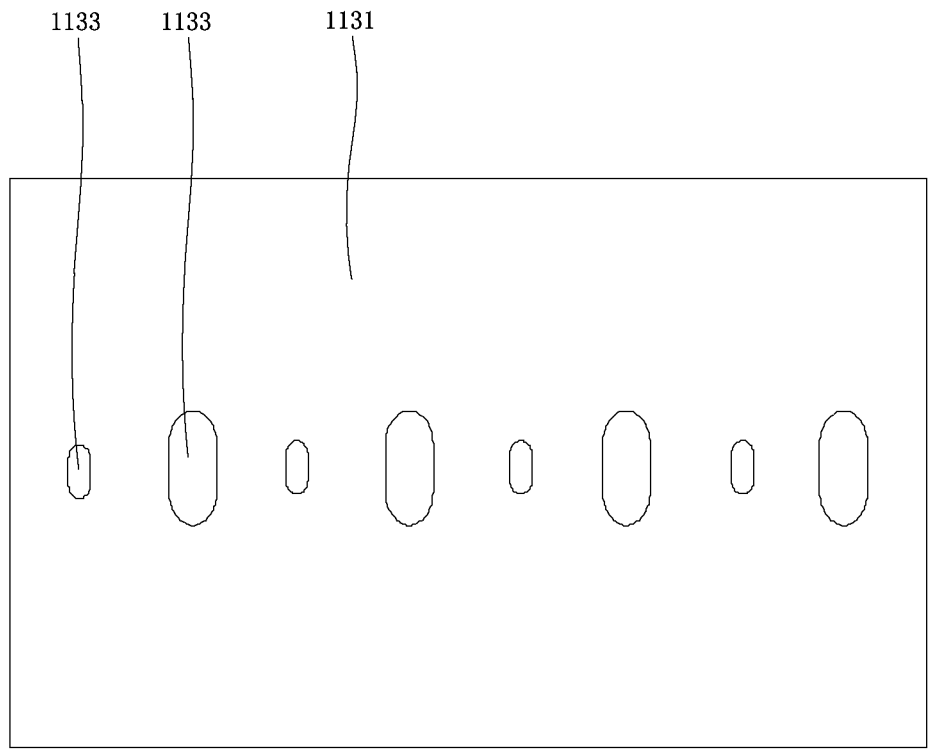
FIG. 19 is a second schematic structural diagram of a bottom wall according to another embodiment of this application.
Figure 20:
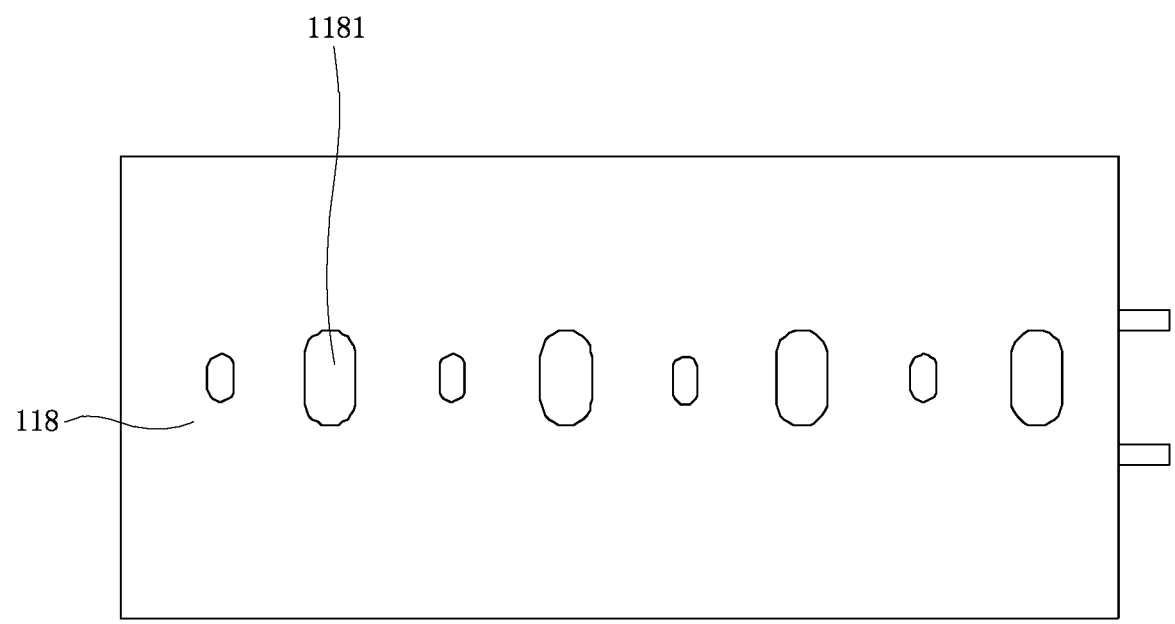
FIG. 20 is a schematic structural diagram of a thermal management part according to another embodiment of this application.

It should be noted that, in the foregoing implementation, the second through-holes 1181 need to be corresponding to the first through-holes 1133 respectively. For example, two discharge channels 117 are provided in a bottom wall 1131 shown in FIG. 15, a plurality of first through-holes 1133 communicating with two discharge channels 117 are provided in a bottom wall 1131 shown in FIG. 16, and correspondingly, a plurality of second through-holes 1181 that are corresponding to the first through-holes 1133 respectively are provided in a thermal management part 118 shown in FIG. 17. For example, a discharge channel 117 is provided in a bottom wall 1131 shown in FIG. 18, a plurality of first through-holes 1133 communicating with one discharge channel 117 are provided in a bottom wall 1131 shown in FIG. 19, and correspondingly, a plurality of second through-holes 1181 that are corresponding to the first through-holes 1133 respectively are provided in a thermal management part 118 shown in FIG. 20.

The foregoing has described the battery 11 in the embodiments of this application with reference to FIG. 1 to FIG. 20. The following will describe a preparation method and apparatus of battery in the embodiments of this application. For a part that is not described in detail, reference may be made to the foregoing embodiments.

An embodiment of this application provides a preparation method of battery, including the following steps:
configuring a first battery cell 111;
configuring a second battery cell 112 to be adjacent to the first battery cell 111, where an energy density of the second battery cell 112 is less than that of the first battery cell 111; and
configuring a first thermal insulation member 114, where the first thermal insulation member 114 is disposed between the first battery cell 111 and the second battery cell 112.

In the preparation method of battery provided in this embodiment, the first battery cell 111 with a higher energy density and the second battery cell 112 with a lower energy density are configured; and the first thermal insulation member 114 is configured between the adjacent first battery cell 111 and second battery cell 112. In this way, even though the first battery cell 111 has a lower thermal stability and more violent thermal failure reaction than the second battery cell 112, after thermal failure occurs in the first battery cell 111, the configured first thermal insulation member 114 can effectively delay or stop thermal transfer between the first battery cell 111 and the second battery cell 112, so as to effectively reduce the probability that the first battery cell 111 triggers chain reaction of the second battery cell 112, thereby improving use safety of the battery 11.

A fourth aspect of the embodiments of this application provides a preparation apparatus of battery, including:
a first battery cell configuration module, configured to configure a first battery cell 111;
a second battery cell configuration module, configured to configure a second battery cell 112 to be adjacent to the first battery cell 111, where an energy density of the second battery cell 112 is less than that of the first battery cell 111; and
a first thermal insulation member configuration module, configured to configure a first thermal insulation member 114, where the first thermal insulation member 114 is disposed between the first battery cell 111 and the second battery cell 112.

In the preparation apparatus of battery in this embodiment, the first battery cell configuration module is used to configure the first battery cell 111; the second battery cell configuration module is used to configure the second battery cell 112, where the configured second battery cell 112 is disposed adjacent to the first battery cell 111, and an energy density of the second battery cell 112 is less than that of the first battery cell 111; and the first thermal insulation member configuration module is used to configure the first thermal insulation member 114, where the configured first thermal insulation member 114 is disposed between the first battery cell 111 and the second battery cell 112. In this way, even though the first battery cell 111 has a lower thermal stability and more violent thermal failure reaction than the second battery cell 112, after thermal failure occurs in the first battery cell 111, the first thermal insulation member 114 can effectively delay or stop thermal transfer between the first battery cell 111 and the second battery cell 112, so as to effectively reduce the probability that the first battery cell 111 triggers chain reaction of the second battery cell 112, thereby improving use safety of the battery 11.

The preparation apparatus of battery in this embodiment may be applied to the preparation method of battery in the foregoing embodiment. That is, the preparation method of battery in the foregoing embodiment may be specifically implemented by using the preparation apparatus of battery in this embodiment.

In conclusion, in the battery 11, the apparatus, the preparation method of battery, and the preparation apparatus of battery provided in this application, the first thermal insulation member 114 is disposed between the first battery cell 111 with a higher energy density and the second battery cell 112 with a lower energy density, which can effectively delay or stop thermal transfer between the first battery cell 111 and the second battery cell 112, so as to effectively reduce the probability that the first battery cell 111 triggers chain reaction of the second battery cell 112, thereby improving use safety of the battery 11.

The embodiments or implementations in this specification are described in a progressive manner, each embodiment focuses on the difference from other embodiments, and the same and similar parts between the embodiments may refer to each other.

In the description of this specification, reference to the description of the terms "an implementation", "some implementations", "an example of the implementation", "an example", "a specific example", or "some examples" means that particular features, structures, materials or characteristics described in connection with the implementations or examples are included in at least one implementation or example of this application. In this specification, descriptions of examples of the above terms do not necessarily refer to the same implementation or example. Furthermore, the particular features, structures, materials, or characteristics described may be combined in a suitable manner in any one or more implementations or examples.

In conclusion, it should be noted that each foregoing embodiment is merely intended for describing the technical solutions of this application but not for limiting this application. Although this application is described in detail with reference to each foregoing embodiment, persons of ordinary skill in the art should understand that they may still make modifications to the technical solutions described in each foregoing embodiment or make equivalent replacements to some or technical features thereof, without departing from the scope of the technical solutions of each embodiment of this application.

What is claimed is:

1. A battery, comprising:
   a plurality of first battery cells;
   a plurality of second battery cells, at least one of the plurality of second battery cells being disposed adjacent to at least one of the plurality of first battery cells, wherein an energy density of each of the plurality of second battery cells is less than that of each of the plurality of first battery cells;
   a first thermal insulation member disposed between the at least one of the plurality of first battery cells and the at least one of the plurality of second battery cells, the first thermal insulation member being a flat structure disposed between a side surface of the at least one of the plurality of first battery cells and a side surface of the at least one of the plurality of second battery cells, an overlapping area between the first thermal insulation member and the side surface of the at least one of the plurality of first battery cells being smaller than an area of the side surface of the at least one of the plurality of first battery cells, and an overlapping area between the first thermal insulation member and the side surface of the at least one of the plurality of second battery cells being smaller than an area of the side surface of the at least one of the plurality of second battery cells;
   a second thermal insulation member disposed between two of the plurality of first battery cells that are adjacent to each other; and
   a third thermal insulation member disposed between two of the plurality of second battery cells that are adjacent to each other;
   wherein:
      the first thermal insulation member comprises a first hollow part in a center of the first thermal insulation member and penetrating the first thermal insulation member, the first hollow part being located between the side surface of the at least one of the plurality of first battery cells and the side surface of the at least one of the plurality of second battery cells, and the first hollow part being not filled with thermal insulation material;
      the second thermal insulation member comprises a second hollow part in a center of the second thermal insulation member and penetrating the second thermal insulation member, the second hollow part being not filled with thermal insulation material; and
      the third thermal insulation member does not comprise a hollow part.

2. The battery according to claim 1, wherein the first thermal insulation member is a square frame structure.

3. The battery according to claim 1, wherein the ratio of the energy density E1 of each of the plurality of first battery cells to the energy density E2 of each of the plurality of second battery cells ranges from $1.26 \leq E1/E2 \leq 2.14$.

4. The battery according to claim 1, wherein a first pressure relief mechanism is disposed on one of the plurality of first battery cells, and the first pressure relief mechanism is configured to be actuated when internal pressure or temperature of the one of the plurality of first battery cells reaches a threshold to release the internal pressure;
   a second pressure relief mechanism is disposed on one of the plurality of second battery cells, and the second pressure relief mechanism is configured to be actuated when internal pressure or temperature of the one of the plurality of second battery cells reaches a threshold to release the internal pressure; and
   an area of the first pressure relief mechanism is greater than an area of the second pressure relief mechanism.

5. The battery according to claim 4, further comprising a discharge channel, wherein the discharge channel is disposed facing the first pressure relief mechanism and/or the second pressure relief mechanism, and the discharge channel is configured to collect emissions from the one of the plurality of first battery cells when the first pressure relief mechanism is actuated, and/or collect emissions from the one of the plurality of second battery cells when the second pressure relief mechanism is actuated.

6. The battery according to claim 5, wherein the battery includes two discharge channels, the discharge channels are spaced apart from each other, and the first pressure relief mechanism and the second pressure relief mechanism are disposed facing the two discharge channels, respectively.

7. The battery according to claim 5, wherein the battery includes two discharge channels spaced apart from each other and two first battery cells, and two first pressure relief mechanisms of two of the plurality of first battery cells are disposed facing the two discharge channels, respectively; and/or
   the battery includes two discharge channels spaced apart from each other and two second battery cells, and two second pressure relief mechanisms of two of the plurality of second battery cells are disposed facing the two discharge channels, respectively.

8. The battery according to claim 5, wherein the battery further comprises a box body, the box body has a plurality of walls, the plurality of walls are configured to enclose an accommodating cavity for accommodating the plurality of first battery cells and the plurality of second battery cells, a hollow chamber is provided in at least one of the plurality of walls, and the hollow chamber is configured to form the discharge channel; and
   the plurality of walls comprises a bottom wall, wherein the bottom wall is configured to support the plurality of first battery cells and the plurality of second battery cells.

9. The battery according to claim 8, wherein the at least one of the plurality of walls is constructed to be broken when the first pressure relief mechanism and/or the second pressure relief mechanism is actuated to cause the emissions from the one of the plurality of first battery cells and/or the one of the plurality of second battery cells to pass through the at least one of the plurality of walls and enter the discharge channel.

10. The battery according to claim 8, wherein a first through-hole is provided in the at least one of the plurality of walls, and the first through-hole is communicative with the discharge channel, to allow the emissions from the one of the plurality of first battery cells and/or the one of the plurality of second battery cells to enter the discharge channel via the first through-hole when the first pressure relief mechanism and/or the second pressure relief mechanism is actuated.

11. The battery according to claim 8, wherein the battery further comprises a thermal management part configured to accommodate fluid to adjust temperature of the one of the plurality of first battery cells and temperature of the one of the plurality of second battery cells, wherein the thermal management part is disposed among the one of the plurality of first battery cells and the one of the plurality of second battery cells and the at least one of the plurality of walls, and the thermal management part is constructed to be broken when the first pressure relief mechanism and/or the second pressure relief mechanism is actuated to cause the fluid to flow out.

12. The battery according to claim 11, wherein a first through-hole is provided in the at least one of the plurality of walls, and the first through-hole is communicative with the discharge channel to allow the emissions from the one of the plurality of first battery cells and/or the one of the plurality of second battery cells to enter the discharge channel via the first through-hole when the first pressure relief mechanism and/or the second pressure relief mechanism is actuated;

the thermal management part includes a second through-hole, and the second through-hole is constructed to communicate with the discharge channel, to allow the emissions from the one of the plurality of first battery cells and/or the one of the plurality of second battery cells to enter the discharge channel via the second through-hole when the first pressure relief mechanism and/or the second pressure relief mechanism is actuated; and the second through-hole communicates with the discharge channel via the first through-hole.

13. An apparatus, comprising the battery according to claim 1, wherein the battery is configured to supply electric energy.

14. A manufacturing method of batteries, comprising the following steps:

configuring a plurality of first battery cells;

configuring a plurality of second battery cells, at least one of the plurality of second battery cells being disposed adjacent to at least one of the plurality of first battery cells, wherein an energy density of each of the plurality of second battery cells is less than that of each of the plurality of first battery cells;

configuring a first thermal insulation member, a second thermal insulation member, and a third thermal insulation member, wherein:

the first thermal insulation member is disposed between the at least one of the plurality of first battery cells and the at least one of the plurality of second battery cells, the first thermal insulation member being a flat structure disposed between a side surface of the at least one of the plurality of first battery cells and a side surface of the at least one of the plurality of second battery cells, an overlapping area between the first thermal insulation member and the side surface of the at least one of the plurality of first battery cells being smaller than an area of the side surface of the at least one of the plurality of first battery cells, and an overlapping area between the first thermal insulation member and the side surface of the at least one of the plurality of second battery cells being smaller than an area of the side surface of the at least one of the plurality of second battery cells;

the second thermal insulation member is disposed between two of the plurality of first battery cells that are adjacent to each other;

the third thermal insulation member is disposed between two of the plurality of second battery cells that are adjacent to each other;

the first thermal insulation member comprises a first hollow part in a center of the first thermal insulation member and penetrating the first thermal insulation member, the first hollow part being located between the side surface of the at least one of the plurality of first battery cells and the side surface of the at least one of the plurality of second battery cells, and the first hollow part being not filled with thermal insulation material;

the second thermal insulation member comprises a second hollow part in a center of the second thermal insulation member and penetrating the second thermal insulation member, the second hollow part being not filled with thermal insulation material; and the third thermal insulation member does not comprise a hollow part.

\* \* \* \* \*